(12) United States Patent
Kotra et al.

(10) Patent No.: US 12,212,743 B2
(45) Date of Patent: Jan. 28, 2025

(54) ENCODER, A DECODER AND CORRESPONDING METHODS USING AN ADAPTIVE LOOP FILTER

(71) Applicant: Huawei Technologies Co., Ltd., Shenzhen (CN)

(72) Inventors: Anand Meher Kotra, Munich (DE); Semih Esenlik, Munich (DE); Jianle Chen, San Diego, CA (US); Han Gao, Munich (DE); Biao Wang, Munich (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 354 days.

(21) Appl. No.: 17/518,923

(22) Filed: Nov. 4, 2021

(65) Prior Publication Data
US 2022/0060703 A1 Feb. 24, 2022

Related U.S. Application Data

(63) Continuation of application No. PCT/CN2020/088389, filed on Apr. 30, 2020.
(Continued)

(51) Int. Cl.
*H04N 19/70* (2014.01)
*H04N 19/117* (2014.01)
(Continued)

(52) U.S. Cl.
CPC ......... *H04N 19/117* (2014.11); *H04N 19/176* (2014.11); *H04N 19/70* (2014.11); *H04N 19/82* (2014.11)

(58) Field of Classification Search
None
See application file for complete search history.

(56) References Cited

U.S. PATENT DOCUMENTS

| | | | |
|---|---|---|---|
| 9,094,658 B2 * | 7/2015 | Fu | ......................... H04N 19/137 |
| 9,386,316 B2 | 7/2016 | Ye et al. | |

(Continued)

FOREIGN PATENT DOCUMENTS

| | | |
|---|---|---|
| CN | 102857746 A | 1/2013 |
| CN | 103096054 A | 5/2013 |

(Continued)

OTHER PUBLICATIONS

Bjontegaard G et al:"Adaptive deblockingfilter," IEEE Transactions on Circuits and Systems for Video Technology, IEEE, USA, vol. 13, No. 7, Jul. 1, 2003, XP011099254, 6 pages.
(Continued)

*Primary Examiner* — Mohammad J Rahman
(74) *Attorney, Agent, or Firm* — Conley Rose, P.C.

(57) ABSTRACT

A method of coding, implemented by a decoding device, includes obtaining a bitstream wherein at least one bit in the bitstream representing a syntax element for a current block, wherein the syntax element specifies the clipping index of the clipping value for an adaptive loop filter (ALF); parsing the bitstream to obtain a value of the syntax element for the current block, wherein the syntax element is coded using a fixed length code; applying adaptive loop filtering on the current block, based on the value of the syntax element for the current block. Herein fixed length code means that all possible values of the syntax element are signaled using the same number of bits.

20 Claims, 24 Drawing Sheets

Related U.S. Application Data

(60) Provisional application No. 62/843,431, filed on May 4, 2019.

(51) Int. Cl.
  H04N 19/176 (2014.01)
  H04N 19/82 (2014.01)

(56) References Cited

U.S. PATENT DOCUMENTS

| | | | |
|---|---|---|---|
| 9,451,252 B2 | 9/2016 | Chen et al. | |
| 9,615,093 B2* | 4/2017 | Fu | H04N 19/159 |
| 9,998,737 B2* | 6/2018 | Fu | H04N 19/154 |
| 10,419,764 B2* | 9/2019 | Park | H04N 19/80 |
| 10,708,591 B2* | 7/2020 | Zhang | H04N 19/96 |
| 2004/0060067 A1* | 3/2004 | Yi | H04N 7/147 725/105 |
| 2011/0249736 A1* | 10/2011 | Segall | H04N 19/196 375/240.12 |
| 2013/0259117 A1* | 10/2013 | Fu | H04N 19/439 375/240.02 |
| 2013/0272372 A1 | 10/2013 | Hannuksela et al. | |
| 2014/0003491 A1 | 1/2014 | Chen et al. | |
| 2014/0010278 A1 | 1/2014 | Lou et al. | |
| 2014/0023136 A1* | 1/2014 | Park | H04N 19/157 375/240.12 |
| 2014/0198840 A1* | 7/2014 | Huang | H04N 19/82 375/240.02 |
| 2014/0294067 A1* | 10/2014 | Li | H04N 19/463 375/240.02 |
| 2015/0350648 A1* | 12/2015 | Fu | H04N 19/463 375/240.02 |
| 2017/0163982 A1* | 6/2017 | Fu | H04N 19/463 |
| 2018/0115787 A1 | 4/2018 | Koo et al. | |
| 2018/0302640 A1* | 10/2018 | Li | H04N 19/23 |
| 2019/0238890 A1* | 8/2019 | Tsai | H04N 19/46 |
| 2019/0297320 A1 | 9/2019 | Yamamoto et al. | |
| 2020/0053358 A1 | 2/2020 | Moon et al. | |
| 2020/0236353 A1 | 7/2020 | Zhang et al. | |
| 2020/0244998 A1* | 7/2020 | Gisquet | H04N 19/117 |
| 2021/0021819 A1* | 1/2021 | Ikeda | H04N 19/157 |
| 2021/0368171 A1 | 11/2021 | Zhang et al. | |

FOREIGN PATENT DOCUMENTS

| | | |
|---|---|---|
| CN | 109076219 A | 12/2018 |
| JP | 2018532318 A | 11/2018 |
| JP | 2022526633 A | 5/2022 |
| RU | 2584501 C1 | 5/2016 |
| RU | 2654138 C2 | 5/2018 |
| WO | 2014055594 A2 | 4/2014 |
| WO | 2017045580 A1 | 3/2017 |
| WO | 2017045580 A8 | 3/2017 |
| WO | 2017195532 A1 | 11/2017 |
| WO | 2018135830 A1 | 7/2018 |
| WO | 2020151714 A1 | 7/2020 |
| WO | 2020211770 A1 | 10/2020 |

OTHER PUBLICATIONS

ITU-T H.264, "Series H: Audiovisual and Multimedia Systems, Infrastructure of audiovisual services—Coding of moving video, Advanced video coding for generic audiovisual services," Apr. 2017, 812 pages.

JVET-O0047-v2, Kotra A., et al, "Non-CE5: Alternative signalling for ALF clipping parameters," Joint Video Experts Team (JVET) of ITU-T SG 16 WP 3 and ISO/IEC JTC 1/SC 29/WG 11, 15th Meeting: Gothenburg, SE, Jul. 3-12, 2019, 8 pages.

JVET-O0064-v1, Hu, N., et al, "Non-CE5: Modification of clipping value signalling for adaptive loop filter," Joint Video Experts Team (JVET) of ITU-T SG 16 WP 3 and ISO/IEC JTC 1/SC 29/WG 11, 15th Meeting: Gothenburg, SE, Jul. 3-12, 2019, 9 pages.

JVET-O0058-v1, Lim, S., et al, "Non-CE5: Simplification on ALF clipping parameter coding," Joint Video Experts Team (JVET) of ITU-T SG 16 WP 3 and ISO/IEC JTC 1/SC 29/WG 11, 15th Meeting: Gothenburg, SE, Jul. 3-12, 2019, 7 pages.

JVET-O0067-v1, Zhang, L., et al, "Non-CE5: Modified coding method for ALF clipping parameters," Joint Video Experts Team (JVET)of ITU-T SG 16 WP 3 and ISO/IEC JTC 1/SC 29/WG 11, 15th Meeting: Gothenburg, SE, Jul. 3-12, 2019, 5 pages.

JVET-O0301, Paluri, S., et al, "AHG17: Simplification of ALF Clipping Coefficients in the APS," Joint Video Experts Team (JVET) of ITU-T SG 16 WP 3 and ISO/IEC JTC 1/SC 29/WG 11, 15th Meeting: Gothenburg, SE, Jul. 3-12, 2019, 4 pages.

JVET-O0430-v2, Meng, X., et al, "Non-CE5: Modification of clipping value signalling for ALF," Joint Video Experts Team (JVET) of ITU-T SG 16 WP 3 and ISO/IEC JTC 1/SC 29/WG 11, 15th Meeting: Gothenburg, SE, Jul. 3-12, 2019, 9 pages.

ITU-T H.265, "Series H: Audiovisual and Multimedia Systems Infrastructure of audiovisual services—Coding of moving video, High efficiency video coding," Feb. 2018, 692 pages.

Benjamin Bross, "Versatile Video Coding (Draft 4)," Joint Video Experts Team (JVET) of ITU-T SG 16 WP 3 and ISO/IEC JTC 1/SC29/WG 11, 13th Meeting: Marrakech, MA, Jan. 9-18, 2019, JVET-M1001-v 5, 286 pages.

Jonathan Taquet, "CE: Results of tests CE5-3.1 to CE5-3.4 on Non-Linear Adaptive Loop Filter," Joint Video Experts Team (JVET) of ITU-T SG 16 WP 3 and ISO/IEC JTC 1/SC29/WG 11, 14th Meeting: Geneva, CH, Mar. 19-27, 2019, JVET-N0242, Mar. 19-27, 2019, 10 pages.

Jianle Chen et al:"Algorithm description for Versatile Video Coding and Test Model 8 (VTM 8)."Joint Video Experts Team (JVET) of ITU-T SG 16 WP 3 and ISO/IEC JTC 1/SC 29/WG 11 17th Meeting: Brussels, BE, Jan. 7-17, 2020. JVET-Q2002-v3, total 97 pages.

* cited by examiner

| | |
|---|---|
| if( alf_luma_clip ) { | |
| alf_luma_clip_min_eg_order_minus1 | ue(v) |
| for( i = 0; i < 3; i++ ) | |
| alf_luma_clip_eg_order_increase_flag[ i ] | u(1) |
| for( sigFiltIdx = 0; sigFiltIdx <= alf_luma_num_filters_signalled_minus1; sigFiltIdx++ ) { | |
| if( alf_luma_coeff_flag[ sigFiltIdx ] ) { | |
| for( j = 0; j < 12; j++ ) { | |
| if( filterCoefficients[ sigFiltIdx ][ j ] ) | |
| alf_luma_clip_idx[ sigFiltIdx ][ j ] | uek(v) |
| } | |
| } | |
| } | |

| | |
|---|---|
| if( alf_chroma_idc > 0 && alf_chroma_clip ) { | |
| alf_chroma_clip_min_eg_order_minus1 | ue(v) |
| for( i = 0; i < 2; i++ ) | |
| alf_chroma_clip_eg_order_increase_flag[ i ] | u(1) |
| for( j = 0; j < 6; j++ ) { | |
| if( alf_chroma_coeff_abs[ j ] ) | |
| alf_chroma_clip_idx[ j ] | uek(v) |
| } | |

FIG. 8

| | | | | | |
|---|---|---|---|---|---|
| if( alf_luma_clip ) { | | | | | |
| for( sfIdx = 0; sfIdx <= alf_luma_num_filters_signaled_minus1; sfIdx++ ) { | | | | | |
| if( alf_luma_coeff_flag[ sfIdx ] ) { | | | | | |
| for( j = 0; j < 12; j++ ) { | | | | | |
| if( filterCoefficients[ sfIdx ][ j ] ) | | | | | |
| alf_luma_clip_idx[ sfIdx ][ j ] | | | | | u(2) |
| } | | | | | |
| } | | | | | |
| } | | | | | |
| if( alf_chroma_idc > 0 && alf_chroma_clip ) { | | | | | |
| for( j = 0; j < 6; j++ ) { | | | | | |
| if( alf_chroma_coeff_abs[ j ] ) | | | | | |
| alf_chroma_clip_idx[ j ] | | | | | u(2) |
| } | | | | | |
| } | | | | | |

FIG. 9

ENCODER, A DECODER AND CORRESPONDING METHODS USING AN ADAPTIVE LOOP FILTER

CROSS-REFERENCE TO RELATED APPLICATIONS

This is a continuation of International Patent Application No. PCT/CN2020/088389 filed on Apr. 30, 2020, which claims priority to U.S. Provisional Patent Application No. 62/843,431 filed May 4, 2019. The disclosures of the aforementioned patent applications are hereby incorporated by reference in their entireties.

TECHNICAL FIELD

Embodiments of the present disclosure generally relate to the field of picture processing and in particular to filtering samples of blocks in a picture.

BACKGROUND

Video coding (video encoding and decoding) is used in a wide range of digital video applications, for example broadcast digital television (TV), video transmission over internet and mobile networks, real-time conversational applications such as video chat, video conferencing, DIGITAL VERSATILE DISC (DVD) and BLU-RAY discs, video content acquisition and editing systems, and camcorders of security applications.

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in picture quality are desirable.

SUMMARY

Embodiments of the present application provide apparatuses and methods for encoding and decoding according to the independent claims.

The foregoing and other objects are achieved by the subject matter of the independent claims. Further implementation forms are apparent from the dependent claims, the description and the figures.

According to a first aspect of the present disclosure, there is provided a method of coding, implemented by a decoding device, the method includes the following.

Obtaining a bitstream, wherein at least one bit in the bitstream is represents a syntax element for a current block, wherein the syntax element specifies the clipping index of the clipping value for adaptive loop filter (ALF), parsing the bitstream to obtain a value of the syntax element for the current block, wherein the syntax element is coded using a fixed length code, applying adaptive loop filtering on the current block, based on the value of the syntax element for the current block. Herein fixed length code means that all possible values of the syntax element are signaled using the same number of bits. This provides a simpler method of signaling clipping parameters. Further, the coding efficiency is improved.

In a possible implementation form of the method according to the first aspect as such, the value of the syntax element for the current block is obtained by using only the at least one bit.

In a possible implementation form of the method according to any preceding implementation or the first aspect as such, the at least one bit is two bits.

In a possible implementation form of the method according to any preceding implementation or the first aspect as such, wherein the at least one bit in the bitstream represents the value of the syntax element.

In a possible implementation form of the method according to any preceding implementation or the first aspect as such, wherein the syntax element is for chroma ALF or luma ALF.

In a possible implementation form of the method according to any preceding implementation or the first aspect as such, wherein the clipping value is used to determine a clipping range used to limit (or clip) a difference between a target sample value and a nearby sample value, and the limited sample value difference (or clipped sample value difference) is used to modify the target sample value in the process of ALF.

In a possible implementation form of the method according to any preceding implementation or the first aspect as such, wherein the applying adaptive loop filtering on the current block, based on the value of the syntax element comprises obtaining the clipping value based on the value of the syntax element, using the clipping value to limit (or clip) a difference between a target sample value of the current block and a nearby sample value, multiplying the limited sample value difference (or clipped sample value difference) by a coefficient of ALF, using the result of multiplication to modify the target sample value.

In a possible implementation form of the method according to any preceding implementation or the first aspect as such, wherein the clipping value is determined by using the clipping index specified by the syntax element and a mapping between clipping indexes and clipping values.

In a possible implementation form of the method according to any preceding implementation or the first aspect as such, the fixed length code comprises binary representation of an unsigned integer using the at least one bit. In other word, the at least one bit is a binary representation of the value of the syntax element and the value of the syntax element is an unsigned integer.

In a possible implementation form of the method according to any preceding implementation or the first aspect as such, the syntax element is applied to a set of blocks and the current block is one block in the set of blocks.

In a possible implementation form of the method according to any preceding implementation or the first aspect as such, the syntax element is at slice level.

According to a second aspect of the present disclosure, there is provided a method of coding, implemented by a decoding device, the method includes the following.

Obtaining a bitstream, wherein at least one bit in the bitstream represents a syntax element for a current block, wherein the syntax element is an ALF clipping value index and/or an ALF coefficient parameter, parsing the bitstream to obtain a value of the syntax element for the current block, wherein the value of the syntax element for the current block is obtained by using only the at least one bit of the syntax element, applying adaptive loop filtering on the current block, based on the value of the syntax element for the current block.

In a possible implementation form of the method according to the second aspect as such, the syntax element is coded using a fixed length code.

In a possible implementation form of the method according to the preceding implementation, the fixed length code comprises binary representation of an unsigned integer using the at least one bit. In other word, the at least one bit is a binary representation of the value of the syntax element and the value of the syntax element is an unsigned integer.

In a possible implementation form of the method according to the second aspect as such or any preceding implementation thereof, the syntax element itself defines the value of the syntax element.

In a possible implementation form of the method according to the second aspect as such or any preceding implementation thereof, wherein the at least one bit in the bitstream represents the value of the syntax element.

In a possible implementation form of the method according to the second aspect as such or any preceding implementation thereof, wherein the ALF clipping value index specifies the clipping index of the clipping value for ALF.

In a possible implementation form of the method according to the second aspect as such or any preceding implementation thereof, wherein ALF coefficient parameter is used to obtain a coefficient of ALF.

In a possible implementation form of the method according to the second aspect as such or any preceding implementation thereof, wherein the value of the syntax element for the current block is obtained by using only the at least one bit of the syntax element means the value of the syntax element is defined by the syntax element itself.

In a possible implementation form of the method according to the second aspect as such or any preceding implementation thereof, the syntax element is applied to a set of blocks and the current block is one block in the set of blocks.

In a possible implementation form of the method according to the second aspect as such or any preceding implementation thereof, the syntax element is at slice level.

In a possible implementation form of the method according to the second aspect as such or any preceding implementation thereof, the ALF coefficient parameter is used to determine an ALF coefficient.

In a possible implementation form of the method according to the first aspect or the second aspect as such or any preceding implementation thereof, the syntax element is the ALF clipping value index, and the at least one bit representing the syntax element is two bits.

In a possible implementation form of the method according to the preceding implementation, the ALF clipping value index identifies one clipping value out of four clipping values.

In a possible implementation form of the method according to the first or second aspect as such or any preceding implementation thereof, the value of the ALF clipping value index is used to determine a clipping range, the clipping range is used in the adaptive loop filtering process.

According to a third aspect of the present disclosure, there is provided a method of coding, implemented by an encoding device, the method includes the following.

Determining a value of a syntax element for a current block, wherein the syntax element specifies the clipping index of the clipping value for ALF, generating a bitstream based on the value of the syntax element, wherein at least one bit in the bitstream represents the syntax element, wherein the syntax element is coded using a fixed length code.

In a possible implementation form of the method according to the third aspect as such, the at least one bit of the syntax element is obtained by using only the value of the syntax element for the current block.

In a possible implementation form of the method according to the third aspect as such or any preceding implementation thereof, the value of the syntax element corresponding to a minimum difference (for example, mean square error or rate distortion cost) between the reconstructed block (or filtered block) of the current block and the original signal of the current block, and the reconstructed block (or filtered block) is a result using the value of the syntax element, and the minimum difference lower than any other difference corresponding to any other possible value of the syntax element.

In a possible implementation form of the method according to the third aspect as such or any preceding implementation thereof, wherein at least one bit in the bitstream represents the value of the syntax element.

In a possible implementation form of the method according to the third aspect as such or any preceding implementation thereof, wherein the clipping value is used to determine a clipping range used to limit (or clip) a difference between a target sample value and a nearby sample value, and the limited sample value difference (or clipped sample value difference) is used to modify the target sample value in the process of ALF.

In a possible implementation form of the method according to the third aspect as such or any preceding implementation thereof, the fixed length code comprises binary representation of an unsigned integer using the at least one bit. In other word, the at least one bit is a binary representation of the value of the syntax element and the value of the syntax element is an unsigned integer.

In a possible implementation form of the method according to the third aspect as such or any preceding implementation thereof, the syntax element is applied to a set of blocks and the current block is one block in the set of blocks.

In a possible implementation form of the method according to the third aspect as such or any preceding implementation thereof, the syntax element is at slice level.

According to a fourth aspect of the present disclosure, there is provided a method of coding, implemented by an encoding device, the method includes the following.

Determining a value of a syntax element for a current block, wherein the syntax element is an ALF clipping value index and/or an ALF filter coefficient parameter, generating a bitstream based on the value of the syntax element, wherein at least one bit in the bitstream represents the syntax element, wherein the at least one bit of the syntax element is obtained by using only the value of the syntax element for the current block.

In a possible implementation form of the method according to the fourth aspect as such or any preceding implementation thereof, the syntax element is coded using a fixed length code.

In a possible implementation form of the method according to the preceding implementation, the fixed length code comprises binary representation of an unsigned integer using the at least one bit. In other word, the at least one bit is a binary representation of the value of the syntax element and the value of the syntax element is an unsigned integer.

In a possible implementation form of the method according to the fourth aspect as such or any preceding implementation thereof, wherein the at least one bit in the bitstream represents the value of the syntax element.

In a possible implementation form of the method according to the fourth aspect as such or any preceding implementation thereof, the syntax element is applied to a set of blocks and the current block is one block in the set of blocks.

In a possible implementation form of the method according to the fourth aspect as such or any preceding implementation thereof, the syntax element is at slice level.

In a possible implementation form of the method according to the fourth aspect as such or any preceding implementation thereof, the ALF coefficient parameter is used to determine an ALF coefficient.

In a possible implementation form of the method according to the third aspect or the fourth aspect as such or any preceding implementation thereof, the syntax element is the ALF clipping value index, and the at least one bit representing the syntax element is two bits.

In a possible implementation form of the method according to the preceding implementation of the fourth aspect, the ALF clipping value index identifies one clipping value out of four clipping values.

In a possible implementation form of the method according to the third aspect or the fourth aspect as such or any preceding implementation thereof, the value of the ALF clipping value index is used to determine a clipping range, the clipping range is used in the adaptive loop filtering process.

According to a fifth aspect of the present disclosure there is provided a decoder comprising processing circuitry for carrying out the method according to the first or second aspect or any implementation thereof.

According to a sixth aspect of the present disclosure there is provided an encoder comprising processing circuitry for carrying out the method according to the third or fourth aspect or any implementation thereof.

According to a seventh aspect of the present disclosure there is provided a computer program product comprising a program code for performing the method according to any one of the first aspect to the fourth aspect or any implementation thereof.

According to an eighth aspect of the present disclosure there is provided a non-transitory computer-readable medium carrying a program code which, when executed by a computer device, causes the computer device to perform the method of any one of the first aspect to the fourth aspect or any implementation thereof.

According to a ninth aspect of the present disclosure there is provided a decoder including the following.

One or more processors, and a non-transitory computer-readable storage medium coupled to the processors and storing programming for execution by the processors, wherein the programming, when executed by the processors, configures the decoder to carry out the method according to the first or second aspect or any implementation thereof.

According to a tenth aspect of the present disclosure there is provided an encoder including the following.

One or more processors, and a non-transitory computer-readable storage medium coupled to the processors and storing programming for execution by the processors, wherein the programming, when executed by the processors, configures the encoder to carry out the method according to the third or fourth aspect or any implementation thereof.

According to an eleventh aspect of the present disclosure there is provided a decoder including the following.

An entropy decoding unit, configured to obtain a bitstream wherein at least one bit in the bitstream representing a syntax element for a current block, wherein the syntax element specifies the clipping index of the clipping value for ALF, the entropy decoding unit, is further configured to parse the bitstream to obtain a value of the syntax element for the current block, wherein the syntax element is coded using a fixed length code, and a filtering unit, configured to apply adaptive loop filtering on the current block, based on the value of the syntax element for the current block.

According to a twelfth aspect of the present disclosure there is provided a decoder including the following.

An entropy decoding unit, configured to obtain a bitstream, wherein at least one bit in the bitstream represents a syntax element for a current block, wherein the syntax element is an ALF clipping value index or an ALF coefficient parameter, the entropy decoding unit, is further configured to parse the bitstream to obtain a value of the syntax element for the current block, wherein the value of the syntax element for the current block is obtained by using only the at least one bit of the syntax element, and a filtering unit, configured to apply adaptive loop filtering on the current block, based on the value of the syntax element for the current block.

According to a thirteenth aspect of the present disclosure there is provided an encoder including the following.

A determining unit, configured to determining a value of a syntax element for a current block, wherein the syntax element specifies the clipping index of the clipping value for ALF, an entropy encoding unit, configured to generate a bitstream based on the value of the syntax element, wherein at least one bit in the bitstream representing the syntax element, wherein the syntax element is coded using a fixed length code.

According to a fourteenth aspect of the present disclosure there is provided an encoder including the following.

A determining unit, configured to determining a value of a syntax element for a current block, wherein the syntax element is an ALF clipping value index or an ALF filter coefficient parameter, an entropy encoding unit, configured to generate a bitstream based on the value of the syntax element, wherein at least one bit in the bitstream represents the syntax element, wherein the at least one bit of the syntax element is obtained by using only the value of the syntax element for the current block.

According to a fifteenth aspect of the present disclosure, there is provided a method of coding, implemented by a decoding device, the method includes the following.

Obtaining a bitstream, wherein n bits in the bitstream representing a syntax element specifying the clipping index of the clipping value for ALF, wherein n is an integer greater than or equal to 0, parsing the bitstream to obtain a value of the syntax element for the current block, wherein the value of the syntax element is a binary representation of an unsigned integer using the n bits, applying adaptive loop filtering on the current block, based on the value of the syntax element for the current block.

In a possible implementation form of the method according to the fifteenth aspect as such, the syntax element may be a slice-level syntax element.

According to a sixteenth aspect of the present disclosure, there is provided a method of coding, implemented by an encoding device, the method includes the following.

Determining a value of a syntax element specifying the clipping index of the clipping value for ALF, wherein n is an integer greater than or equal to 0, generating a bitstream comprising n bits, based on the value of the syntax element, wherein the binary representation of an unsigned integer using the n bits is the value of the syntax element.

In a possible implementation form of the method according to the sixteenth aspect as such, the syntax element may be a slice-level syntax element.

According to a seventeenth aspect of the present disclosure there is provided a decoder including the following.

An entropy decoding unit, configured to obtain a bitstream, wherein n bits in the bitstream represents a slice-level syntax element specifying the clipping index of the clipping value for ALF, wherein n is an integer greater than or equal to 0, the entropy decoding unit, is further configured to parse the bitstream to obtain a value of the syntax element for the current block, wherein the value of the syntax element is a binary representation of an unsigned integer using the n bits, a filtering unit, configured to apply adaptive loop filtering on the current block, based on the value of the syntax element for the current block.

According to an eighteenth aspect of the present disclosure there is provided an encoder including the following.

A determining unit, configured to determining a value of a slice-level syntax element specifying the clipping index of the clipping value for ALF, wherein n is an integer greater than or equal to 0, an entropy encoding unit, configured to generate a bitstream comprising n bits, based on the value of the syntax element, wherein the binary representation of an unsigned integer using the n bits is the value of the syntax element.

According to a nineteenth aspect of the present disclosure there is provided a decoder comprising processing circuitry for carrying out the method according to the fifteenth aspect or any implementation thereof.

According to a twentieth aspect of the present disclosure there is provided an encoder comprising processing circuitry for carrying out the method according to the sixteenth aspect or any implementation thereof.

According to a twenty-first aspect of the present disclosure there is provided a computer program product comprising a program code for performing the method according to fifteenth aspect or the sixteenth aspect or any implementation thereof.

According to a twenty-second aspect of the present disclosure there is provided a non-transitory computer-readable medium carrying a program code which, when executed by a computer device, causes the computer device to perform the method of any one of fifteenth aspect or the sixteenth aspect or any implementation thereof.

According to a twenty-third aspect of the present disclosure there is provided a decoder including the following.

One or more processors, and a non-transitory computer-readable storage medium coupled to the processors and storing programming for execution by the processors, wherein the programming, when executed by the processors, configures the decoder to carry out the method according to the fifteenth aspect or any implementation thereof.

According to a twenty-fourth aspect of the present disclosure there is provided an encoder including the following.

One or more processors, and a non-transitory computer-readable storage medium coupled to the processors and storing programming for execution by the processors, wherein the programming, when executed by the processors, configures the encoder to carry out the method according to the sixteenth aspect or any implementation thereof.

According to a twenty-fifth aspect of the present disclosure there is provided a non-transitory storage medium comprising a bitstream comprising n bits, wherein the binary representation of an unsigned integer using the n bits is a value of a syntax element, and the syntax element specifies the clipping index of the clipping value for ALF, wherein n is an integer greater than or equal to 0.

According to a twenty-sixth aspect of the present disclosure there is provided a non-transitory storage medium comprising a bitstream, wherein at least one bit in the bitstream representing the syntax element, wherein the syntax element is coded using a fixed length code and specifies the clipping index of the clipping value for ALF.

In a possible implementation form of the method according to the twenty-sixth aspect as such, wherein the syntax element itself defines the value of the syntax element.

According to a twenty-seventh aspect of the present disclosure there is provided a non-transitory storage medium comprising a bitstream, wherein at least one bit in the bitstream representing the syntax element, wherein the syntax element is an ALF clipping value index or an ALF filter coefficient parameter, and the at least one bit of the syntax element is obtained by using only the value of the syntax element.

According to a twenty-eighth aspect of the present disclosure there is provided a non-transitory storage medium comprising a bitstream encoded by the method of any aspect or any implementation thereof.

Details of one or more embodiments are set forth in the accompanying drawings and the description below. Other features, objects, and advantages will be apparent from the description, drawings, and claims.

BRIEF DESCRIPTION OF THE DRAWINGS

FIG. 8 illustrates VVC Test Model (VTM)-5.0 ALF luma and chroma clipping parameters signaling;

FIG. 9 illustrates modified VTM-5.0 ALF luma and chroma clipping parameters signaling, wherein clipping parameters are signaled using fixed length code of 2 bits;

Figure 1A:
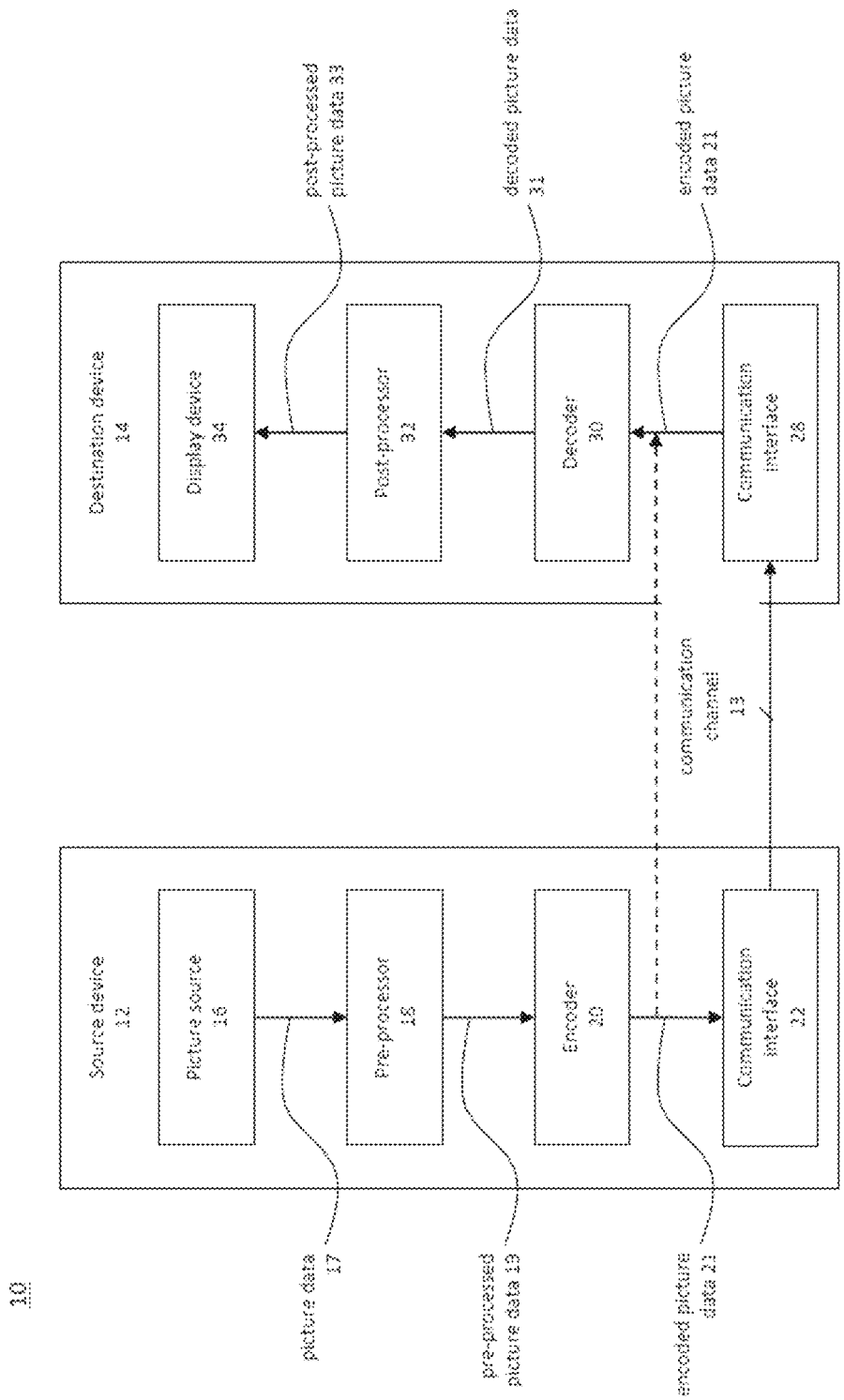
FIG. 1A is a block diagram showing an example of a video coding system configured to implement embodiments of the disclosure.

In the following identical reference signs refer to identical or at least functionally equivalent features if not explicitly specified otherwise.

DETAILED DESCRIPTION OF THE EMBODIMENTS

In the following description, reference is made to the accompanying figures, which form part of the disclosure, and which show, by way of illustration, specific aspects of embodiments of the disclosure or specific aspects in which embodiments of the present disclosure may be used. It is understood that embodiments of the disclosure may be used in other aspects and comprise structural or logical changes not depicted in the figures. The following detailed description, therefore, is not to be taken in a limiting sense, and the scope of the present disclosure is defined by the appended claims.

For instance, it is understood that a disclosure in connection with a described method may also hold true for a corresponding device or system configured to perform the method and vice versa. For example, if one or a plurality of specific method steps are described, a corresponding device may include one or a plurality of units, e.g., functional units, to perform the described one or plurality of method steps (e.g., one unit performing the one or plurality of steps, or a plurality of units each performing one or more of the plurality of steps), even if such one or more units are not explicitly described or illustrated in the figures. On the other hand, for example, if a specific apparatus is described based on one or a plurality of units, e.g., functional units, a corresponding method may include one step to perform the functionality of the one or plurality of units (e.g., one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless specifically noted otherwise.

Video coding typically refers to the processing of a sequence of pictures, which form the video or video sequence. Instead of the term "picture" the term "frame" or "image" may be used as synonyms in the field of video coding. Video coding (or coding in general) comprises two parts video encoding and video decoding. Video encoding is performed at the source side, typically comprising processing (e.g., by compression) the original video pictures to reduce the amount of data required for representing the video pictures (for more efficient storage and/or transmission). Video decoding is performed at the destination side and typically comprises the inverse processing compared to the encoder to reconstruct the video pictures. Embodiments referring to "coding" of video pictures (or pictures in general) shall be understood to relate to "encoding" or "decoding" of video pictures or respective video sequences. The combination of the encoding part and the decoding part is also referred to as CODEC.

In case of lossless video coding, the original video pictures can be reconstructed, i.e. the reconstructed video pictures have the same quality as the original video pictures (assuming no transmission loss or other data loss during storage or transmission). In case of lossy video coding, further compression, e.g., by quantization, is performed, to reduce the amount of data representing the video pictures, which cannot be completely reconstructed at the decoder, i.e. the quality of the reconstructed video pictures is lower or worse compared to the quality of the original video pictures.

Several video coding standards belong to the group of "lossy hybrid video codecs" (i.e. combine spatial and temporal prediction in the sample domain and two-dimensional (2D) transform coding for applying quantization in the transform domain). Each picture of a video sequence is typically partitioned into a set of non-overlapping blocks and the coding is typically performed on a block level. In other words, at the encoder the video is typically processed, i.e. encoded, on a block (video block) level, e.g., by using spatial (intra picture) prediction and/or temporal (inter picture) prediction to generate a prediction block, subtracting the prediction block from the current block (block currently processed/to be processed) to obtain a residual block, transforming the residual block and quantizing the residual block in the transform domain to reduce the amount of data to be transmitted (compression), whereas at the decoder the inverse processing compared to the encoder is applied to the encoded or compressed block to reconstruct the current block for representation. Furthermore, the encoder duplicates the decoder processing loop such that both will generate identical predictions (e.g., intra- and inter predictions) and/or re-constructions for processing, i.e. coding, the subsequent blocks.

In the following embodiments of a video coding system 10, a video encoder 20 and a video decoder 30 are described based on FIGS. 1 to 3.

FIG. 1A is a schematic block diagram illustrating an example coding system 10, e.g., a video coding system 10 (or coding system 10) that may utilize techniques of this present application. Video encoder 20 (or encoder 20) and video decoder 30 (or decoder 30) of video coding system 10 represent examples of devices that may be configured to perform techniques in accordance with various examples described in the present application.

As shown in FIG. 1A, the coding system 10 comprises a source device 12 configured to provide encoded picture data 21 e.g., to a destination device 14 for decoding the encoded picture data 13.

The source device 12 comprises an encoder 20, and may additionally, i.e. optionally, comprise a picture source 16, a pre-processor (or pre-processing unit) 18, e.g., a picture pre-processor 18, and a communication interface or communication unit 22.

The picture source 16 may comprise or be any kind of picture capturing device, for example a camera for capturing a real-world picture, and/or any kind of a picture generating device, for example a computer-graphics processor for generating a computer animated picture, or any kind of other device for obtaining and/or providing a real-world picture, a computer generated picture (e.g., a screen content, a virtual reality (VR) picture) and/or any combination thereof (e.g., an augmented reality (AR) picture). The picture source may be any kind of memory or storage storing any of the aforementioned pictures.

In distinction to the pre-processor 18 and the processing performed by the pre-processing unit 18, the picture or picture data 17 may also be referred to as raw picture or raw picture data 17.

Pre-processor 18 is configured to receive the (raw) picture data 17 and to perform pre-processing on the picture data 17 to obtain a pre-processed picture 19 or pre-processed picture data 19. Pre-processing performed by the pre-processor 18 may, e.g., comprise trimming, color format conversion (e.g., from red, green, and blue (RGB) to luma, blue-difference, and red-difference (YCbCr)), color correction, or de-noising. It can be understood that the pre-processing unit 18 may be optional component.

The video encoder 20 is configured to receive the pre-processed picture data 19 and provide encoded picture data 21 (further details will be described below, e.g., based on FIG. 2).

Communication interface 22 of the source device 12 may be configured to receive the encoded picture data 21 and to transmit the encoded picture data 21 (or any further processed version thereof) over communication channel 13 to another device, e.g., the destination device 14 or any other device, for storage or direct reconstruction.

The destination device 14 comprises a decoder 30 (e.g., a video decoder 30), and may additionally, i.e. optionally, comprise a communication interface or communication unit 28, a post-processor 32 (or post-processing unit 32) and a display device 34.

The communication interface 28 of the destination device 14 is configured receive the encoded picture data 21 (or any further processed version thereof), e.g., directly from the source device 12 or from any other source, e.g., a storage device, e.g., an encoded picture data storage device, and provide the encoded picture data 21 to the decoder 30.

The communication interface 22 and the communication interface 28 may be configured to transmit or receive the encoded picture data 21 or encoded data 13 via a direct communication link between the source device 12 and the destination device 14, e.g., a direct wired or wireless connection, or via any kind of network, e.g., a wired or wireless network or any combination thereof, or any kind of private and public network, or any kind of combination thereof.

The communication interface 22 may be, e.g., configured to package the encoded picture data 21 into an appropriate format, e.g., packets, and/or process the encoded picture data using any kind of transmission encoding or processing for transmission over a communication link or communication network.

The communication interface 28, forming the counterpart of the communication interface 22, may be, e.g., configured to receive the transmitted data and process the transmission data using any kind of corresponding transmission decoding or processing and/or de-packaging to obtain the encoded picture data 21.

Both, communication interface 22 and communication interface 28 may be configured as unidirectional communication interfaces as indicated by the arrow for the communication channel 13 in FIG. 1A pointing from the source device 12 to the destination device 14, or bi-directional communication interfaces, and may be configured, e.g., to send and receive messages, e.g., to set up a connection, to acknowledge and exchange any other information related to the communication link and/or data transmission, e.g., encoded picture data transmission.

The decoder 30 is configured to receive the encoded picture data 21 and provide decoded picture data 31 or a decoded picture 31 (further details will be described below, e.g., based on FIG. 3 or FIG. 5).

The post-processor 32 of destination device 14 is configured to post-process the decoded picture data 31 (also called reconstructed picture data), e.g., the decoded picture 31, to obtain post-processed picture data 33, e.g., a post-processed picture 33. The post-processing performed by the post-processing unit 32 may comprise, e.g., color format conversion (e.g., from YCbCr to RGB), color correction, trimming, or re-sampling, or any other processing, e.g., for preparing the decoded picture data 31 for display, e.g., by display device 34.

The display device 34 of the destination device 14 is configured to receive the post-processed picture data 33 for displaying the picture, e.g., to a user or viewer. The display device 34 may be or comprise any kind of display for representing the reconstructed picture, e.g., an integrated or external display or monitor. The displays may, e.g., comprise liquid-crystal displays (LCD), organic light-emitting diodes (LEDs) (OLEDs) displays, plasma displays, projectors, micro LED displays, liquid crystal on silicon (LCoS), digital light processor (DLP) or any kind of other display.

Although FIG. 1A depicts the source device 12 and the destination device 14 as separate devices, embodiments of devices may also comprise both or both functionalities, the source device 12 or corresponding functionality and the destination device 14 or corresponding functionality. In such embodiments the source device 12 or corresponding functionality and the destination device 14 or corresponding functionality may be implemented using the same hardware and/or software or by separate hardware and/or software or any combination thereof.

As will be apparent for the skilled person based on the description, the existence and (exact) split of functionalities of the different units or functionalities within the source device 12 and/or destination device 14 as shown in FIG. 1A may vary depending on the actual device and application.

Figure 1B:
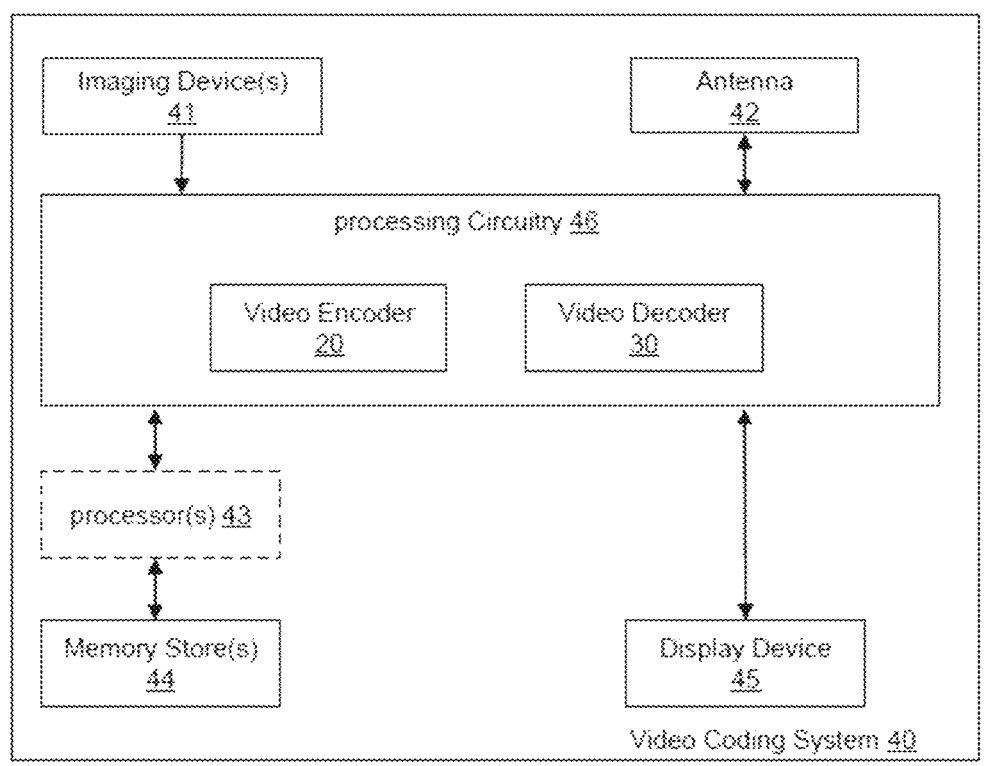
FIG. 1B is a block diagram showing another example of a video coding system configured to implement embodiments of the disclosure.

The encoder 20 (e.g., a video encoder 20) or the decoder 30 (e.g., a video decoder 30) or both encoder 20 and decoder 30 may be implemented via processing circuitry as shown in FIG. 1B, such as one or more microprocessors, digital signal processors (DSPs), application-specific integrated circuits (ASICs), field-programmable gate arrays (FPGAs), discrete logic, hardware, video coding dedicated or any combinations thereof. The encoder 20 may be implemented via processing circuitry 46 to embody the various modules as discussed with respect to encoder 20 of FIG. 2 and/or any other encoder system or subsystem described herein. The decoder 30 may be implemented via processing circuitry 46 to embody the various modules as discussed with respect to decoder 30 of FIG. 3 and/or any other decoder system or subsystem described herein. The processing circuitry may be configured to perform the various operations as discussed later. As shown in FIG. 5, if the techniques are implemented partially in software, a device may store instructions for the software in a suitable, non-transitory computer-readable storage medium and may execute the instructions in hardware using one or more processors to perform the techniques of this disclosure. Either of video encoder 20 and video decoder 30 may be integrated as part of a combined CODEC in a single device, for example, as shown in FIG. 1B.

Source device 12 and destination device 14 may comprise any of a wide range of devices, including any kind of handheld or stationary devices, e.g., notebook or laptop computers, mobile phones, smart phones, tablets or tablet computers, cameras, desktop computers, set-top boxes, televisions, display devices, digital media players, video gaming consoles, video streaming devices (such as content services servers or content delivery servers), broadcast receiver device, broadcast transmitter device, or the like and may use no or any kind of operating system. In some cases, the source device 12 and the destination device 14 may be equipped for wireless communication. Thus, the source device 12 and the destination device 14 may be wireless communication devices.

In some cases, video coding system 10 illustrated in FIG. 1A is merely an example and the techniques of the present application may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In some examples, the encoding and decoding is performed by devices that do not communicate with one another, but simply encode data to memory and/or retrieve and decode data from memory.

For convenience of description, embodiments of the disclosure are described herein, for example, by reference to High-Efficiency Video Coding (HEVC) or to the reference software of Versatile Video coding (VVC), the next generation video coding standard developed by the Joint Collaboration Team on Video Coding (JCT-VC) of International Telecommunication Union (ITU) Telecommunication Standardization Sector (ITU-T) Video Coding Experts Group (VCEG) and International Organization for Standardization (ISO)/International Electrotechnical Commission (IEC) Motion Picture Experts Group (MPEG). One of ordinary skill in the art will understand that embodiments of the disclosure are not limited to HEVC or VVC.

Figure 2:
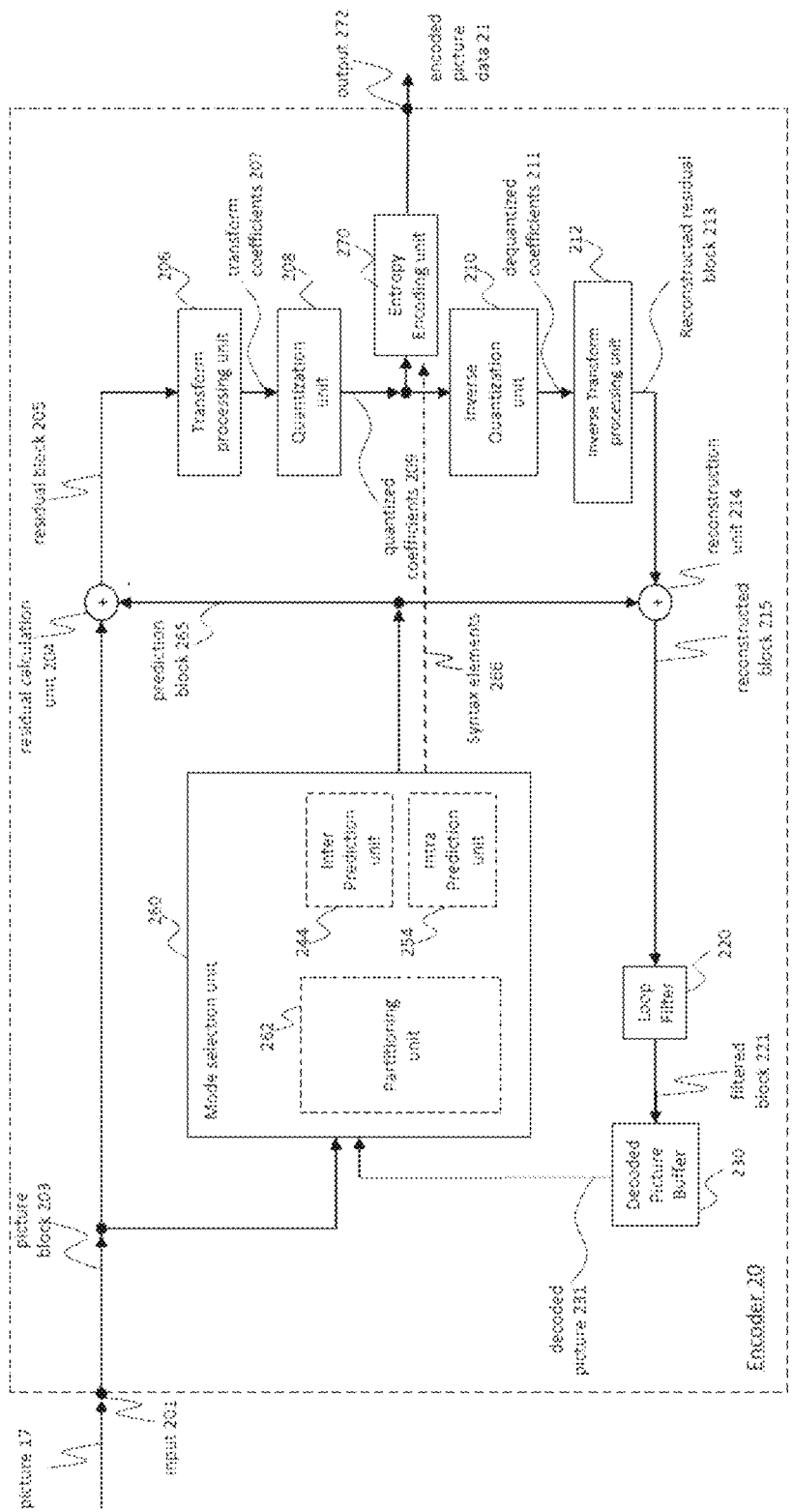
FIG. 2 is a block diagram showing an example of a video encoder configured to implement embodiments of the disclosure.

Encoder and Encoding Method:

FIG. 2 shows a schematic block diagram of an example video encoder 20 that is configured to implement the techniques of the present application. In the example of FIG. 2, the video encoder 20 comprises an input 201 (or input interface 201), a residual calculation unit 204, a transform processing unit 206, a quantization unit 208, an inverse quantization unit 210, and inverse transform processing unit 212, a reconstruction unit 214, a loop filter unit 220, a decoded picture buffer (DPB) 230, a mode selection unit 260, an entropy encoding unit 270 and an output 272 (or output interface 272). The mode selection unit 260 may include an inter prediction unit 244, an intra prediction unit 254 and a partitioning unit 262. Inter prediction unit 244 may include a motion estimation unit and a motion compensation unit (not shown). A video encoder 20 as shown in FIG. 2 may also be referred to as hybrid video encoder or a video encoder according to a hybrid video codec.

Figure 3:
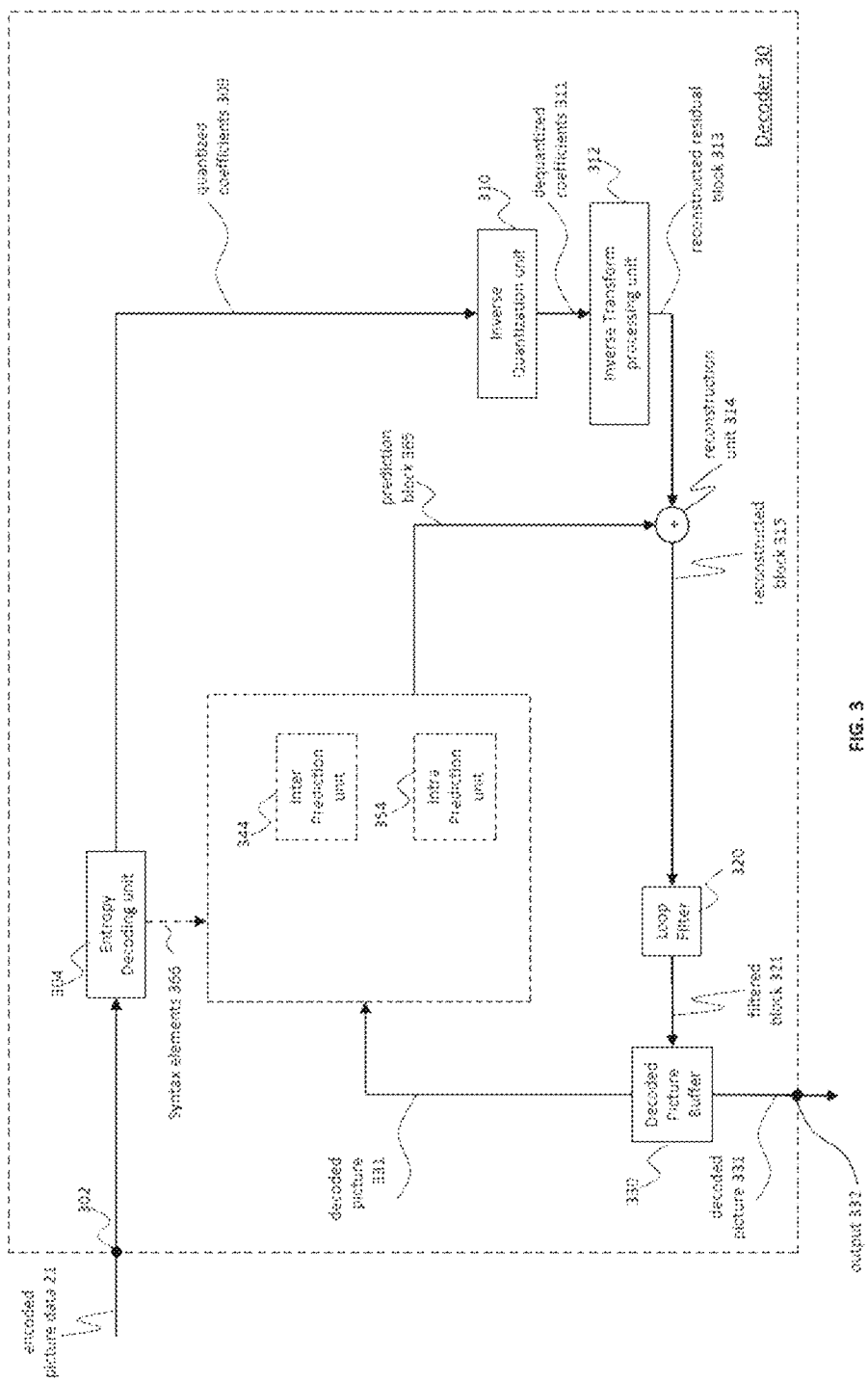
FIG. 3 is a block diagram showing an example structure of a video decoder configured to implement embodiments of the disclosure.

The residual calculation unit 204, the transform processing unit 206, the quantization unit 208, the mode selection unit 260 may be referred to as forming a forward signal path of the encoder 20, whereas the inverse quantization unit 210, the inverse transform processing unit 212, the reconstruction unit 214, the buffer 216, the loop filter 220, the DPB 230, the inter prediction unit 244 and the intra-prediction unit 254 may be referred to as forming a backward signal path of the video encoder 20, wherein the backward signal path of the video encoder 20 corresponds to the signal path of the decoder (see video decoder 30 in FIG. 3). The inverse quantization unit 210, the inverse transform processing unit 212, the reconstruction unit 214, the loop filter 220, the DPB 230, the inter prediction unit 244 and the intra-prediction unit 254 are also referred to forming the "built-in decoder" of video encoder 20.

Pictures & Picture Partitioning (Pictures & Blocks):

The encoder 20 may be configured to receive, e.g., via input 201, a picture 17 (or picture data 17), e.g., picture of a sequence of pictures forming a video or video sequence. The received picture or picture data may also be a pre-processed picture 19 (or pre-processed picture data 19). For sake of simplicity the following description refers to the picture 17. The picture 17 may also be referred to as current picture or picture to be coded (in particular in video coding to distinguish the current picture from other pictures, e.g., previously encoded and/or decoded pictures of the same video sequence, i.e. the video sequence which also comprises the current picture).

A (digital) picture is or can be regarded as a two-dimensional array or matrix of samples with intensity values. A sample in the array may also be referred to as a picture element (pixel) or a pel. The number of samples in horizontal and vertical direction (or axis) of the array or picture define the size and/or resolution of the picture. For representation of color, typically three-color components are employed, i.e. the picture may be represented or include three sample arrays. In RBG format or color space a picture comprises a corresponding red, green and blue sample array. However, in video coding each pixel is typically represented in a luminance and chrominance format or color space, e.g., YCbCr, which comprises a luminance component indicated by Y (sometimes also L is used instead) and two chrominance components indicated by Cb and Cr. The luminance (or luma) component Y represents the brightness or grey level intensity (e.g., like in a grey-scale picture), while the two chrominance (or chroma) components Cb and Cr represent the chromaticity or color information components. Accordingly, a picture in YCbCr format comprises a luminance sample array of luminance sample values (Y), and two chrominance sample arrays of chrominance values (Cb and Cr). Pictures in RGB format may be converted or transformed into YCbCr format and vice versa, the process is also known as color transformation or conversion. If a picture is monochrome, the picture may comprise only a luminance sample array. Accordingly, a picture may be, for example, an array of luma samples in monochrome format or an array of luma samples and two corresponding arrays of chroma samples in 4:2:0, 4:2:2, and 4:4:4 colour format.

Embodiments of the video encoder 20 may comprise a picture partitioning unit (not depicted in FIG. 2) configured to partition the picture 17 into a plurality of (typically non-overlapping) picture blocks 203. These blocks may also be referred to as root blocks, macro blocks (H.264/AVC) or coding tree blocks (CTBs) or coding tree units (CTUs) (H.265/HEVC and VVC). The picture partitioning unit may be configured to use the same block size for all pictures of a video sequence and the corresponding grid defining the block size, or to change the block size between pictures or subsets or groups of pictures, and partition each picture into the corresponding blocks.

In further embodiments, the video encoder may be configured to receive directly a block 203 of the picture 17, e.g., one, several or all blocks forming the picture 17. The picture block 203 may also be referred to as current picture block or picture block to be coded.

Like the picture 17, the picture block 203 again is or can be regarded as a two-dimensional array or matrix of samples with intensity values (sample values), although of smaller dimension than the picture 17. In other words, the block 203 may comprise, e.g., one sample array (e.g., a luma array in case of a monochrome picture 17, or a luma or chroma array in case of a color picture) or three sample arrays (e.g., a luma and two chroma arrays in case of a color picture 17) or any other number and/or kind of arrays depending on the color format applied. The number of samples in horizontal and vertical direction (or axis) of the block 203 define the size of block 203. Accordingly, a block may, for example, an M×N (M-column by N-row) array of samples, or an M×N array of transform coefficients.

Embodiments of the video encoder 20 as shown in FIG. 2 may be configured encode the picture 17 block by block, e.g., the encoding and prediction is performed per block 203.

Residual Calculation:

The residual calculation unit 204 may be configured to calculate a residual block 205 (also referred to as residual 205) based on the picture block 203 and a prediction block 265 (further details about the prediction block 265 are provided later), e.g., by subtracting sample values of the prediction block 265 from sample values of the picture block 203, sample by sample (pixel by pixel) to obtain the residual block 205 in the sample domain.

Transform:

The transform processing unit 206 may be configured to apply a transform, e.g., a discrete cosine transform (DCT) or discrete sine transform (DST), on the sample values of the residual block 205 to obtain transform coefficients 207 in a transform domain. The transform coefficients 207 may also be referred to as transform residual coefficients and represent the residual block 205 in the transform domain.

The transform processing unit 206 may be configured to apply integer approximations of DCT/DST, such as the transforms specified for H.265/HEVC. Compared to an orthogonal DCT transform, such integer approximations are typically scaled by a certain factor. In order to preserve the norm of the residual block which is processed by forward and inverse transforms, additional scaling factors are applied as part of the transform process. The scaling factors are typically chosen based on certain constraints like scaling factors being a power of two for shift operations, bit depth of the transform coefficients, tradeoff between accuracy and implementation costs, etc. Specific scaling factors are, for example, specified for the inverse transform, e.g., by inverse transform processing unit 212 (and the corresponding inverse transform, e.g., by inverse transform processing unit 312 at video decoder 30) and corresponding scaling factors for the forward transform, e.g., by transform processing unit 206, at an encoder 20 may be specified accordingly.

Embodiments of the video encoder 20 (respectively transform processing unit 206) may be configured to output transform parameters, e.g., a type of transform or transforms, e.g., directly or encoded or compressed via the entropy encoding unit 270, so that, e.g., the video decoder 30 may receive and use the transform parameters for decoding.

Quantization:

The quantization unit 208 may be configured to quantize the transform coefficients 207 to obtain quantized coefficients 209, e.g., by applying scalar quantization or vector quantization. The quantized coefficients 209 may also be referred to as quantized transform coefficients 209 or quantized residual coefficients 209.

The quantization process may reduce the bit depth associated with some or all of the transform coefficients 207. For example, an n-bit transform coefficient may be rounded down to an m-bit Transform coefficient during quantization, where n is greater than m. The degree of quantization may be modified by adjusting a quantization parameter (QP). For example for scalar quantization, different scaling may be applied to achieve finer or coarser quantization. Smaller quantization step sizes correspond to finer quantization, whereas larger quantization step sizes correspond to coarser quantization. The applicable quantization step size may be indicated by a QP. The QP may for example be an index to a predefined set of applicable quantization step sizes. For example, small QPs may correspond to fine quantization (small quantization step sizes) and large QPs may correspond to coarse quantization (large quantization step sizes) or vice versa. The quantization may include division by a quantization step size and a corresponding and/or the inverse dequantization, e.g., by inverse quantization unit 210, may include multiplication by the quantization step size. Embodiments according to some standards, e.g., HEVC, may be configured to use a QP to determine the quantization step size. Generally, the quantization step size may be calculated based on a QP using a fixed-point approximation of an equation including division. Additional scaling factors may be introduced for quantization and dequantization to restore the norm of the residual block, which might get modified because of the scaling used in the fixed-point approximation of the equation for quantization step size and QP. In one example implementation, the scaling of the inverse transform and dequantization might be combined. Alternatively, customized quantization tables may be used and signaled from an encoder to a decoder, e.g., in a bitstream. The quantization is a lossy operation, wherein the loss increases with increasing quantization step sizes.

Embodiments of the video encoder 20 (respectively quantization unit 208) may be configured to output QPs, e.g., directly or encoded via the entropy encoding unit 270, so that, e.g., the video decoder 30 may receive and apply the QPs for decoding.

Inverse Quantization:

The inverse quantization unit 210 is configured to apply the inverse quantization of the quantization unit 208 on the quantized coefficients to obtain dequantized coefficients 211, e.g., by applying the inverse of the quantization scheme applied by the quantization unit 208 based on or using the same quantization step size as the quantization unit 208. The dequantized coefficients 211 may also be referred to as dequantized residual coefficients 211 and correspond—although typically not identical to the transform coefficients due to the loss by quantization—to the transform coefficients 207.

Inverse Transform:

The inverse transform processing unit 212 is configured to apply the inverse transform of the transform applied by the transform processing unit 206, e.g., an inverse DCT or inverse DST or other inverse transforms, to obtain a reconstructed residual block 213 (or corresponding dequantized coefficients 213) in the sample domain. The reconstructed residual block 213 may also be referred to as transform block 213.

Reconstruction:

The reconstruction unit 214 (e.g., adder or summer 214) is configured to add the transform block 213 (i.e. reconstructed residual block 213) to the prediction block 265 to obtain a reconstructed block 215 in the sample domain, e.g., by adding—sample by sample—the sample values of the reconstructed residual block 213 and the sample values of the prediction block 265.

Filtering:

The loop filter unit 220 (or loop filter 220), is configured to filter the reconstructed block 215 to obtain a filtered block 221, or in general, to filter reconstructed samples to obtain filtered samples. The loop filter unit is, e.g., configured to smooth pixel transitions, or otherwise improve the video quality. The loop filter unit 220 may comprise one or more loop filters such as a de-blocking filter, a sample-adaptive offset (SAO) filter or one or more other filters, e.g., a bilateral filter, an ALF, a sharpening, a smoothing filters or a collaborative filters, or any combination thereof. Although the loop filter unit 220 is shown in FIG. 2 as being an in loop filter, in other configurations, the loop filter unit 220 may be implemented as a post loop filter. The filtered block 221 may also be referred to as filtered reconstructed block 221.

Embodiments of the video encoder 20 (respectively loop filter unit 220) may be configured to output loop filter parameters (such as sample adaptive offset information), e.g., directly or encoded via the entropy encoding unit 270, so that, e.g., a decoder 30 may receive and apply the same loop filter parameters or respective loop filters for decoding.

DPB:

The DPB 230 may be a memory that stores reference pictures, or in general reference picture data, for encoding video data by video encoder 20. The DPB 230 may be formed by any of a variety of memory devices, such as dynamic random-access memory (RAM) (DRAM), including synchronous DRAM (SDRAM), magnetoresistive RAM (MRAM), resistive RAM (RRAM), or other types of memory devices. The DPB 230 may be configured to store one or more filtered blocks 221. The DPB 230 may be further configured to store other previously filtered blocks, e.g., previously reconstructed and filtered blocks 221, of the same current picture or of different pictures, e.g., previously reconstructed pictures, and may provide complete previously reconstructed, i.e. decoded, pictures (and corresponding reference blocks and samples) and/or a partially reconstructed current picture (and corresponding reference blocks and samples), for example for inter prediction. The DPB 230 may be also configured to store one or more unfiltered reconstructed blocks 215, or in general unfiltered reconstructed samples, e.g., if the reconstructed block 215 is not filtered by loop filter unit 220, or any other further processed version of the reconstructed blocks or samples.

Mode Selection (Partitioning & Prediction):

The mode selection unit 260 comprises partitioning unit 262, inter-prediction unit 244 and intra-prediction unit 254, and is configured to receive or obtain original picture data, e.g., an original block 203 (current block 203 of the current picture 17), and reconstructed picture data, e.g., filtered and/or unfiltered reconstructed samples or blocks of the same (current) picture and/or from one or a plurality of previously decoded pictures, e.g., from DPB 230 or other buffers (e.g., line buffer, not shown). The reconstructed picture data is used as reference picture data for prediction, e.g., inter-prediction or intra-prediction, to obtain a prediction block 265 or predictor 265.

Mode selection unit 260 may be configured to determine or select a partitioning for a current block prediction mode (including no partitioning) and a prediction mode (e.g., an intra or inter prediction mode) and generate a corresponding prediction block 265, which is used for the calculation of the residual block 205 and for the reconstruction of the reconstructed block 215.

Embodiments of the mode selection unit 260 may be configured to select the partitioning and the prediction mode (e.g., from those supported by or available for mode selection unit 260), which provide the best match or in other words the minimum residual (minimum residual means better compression for transmission or storage), or a minimum signaling overhead (minimum signaling overhead means better compression for transmission or storage), or which considers or balances both. The mode selection unit 260 may be configured to determine the partitioning and prediction mode based on rate distortion optimization (RDO), i.e. select the prediction mode which provides a minimum rate distortion. Terms like "best", "minimum", "optimum" etc. in this context do not necessarily refer to an overall "best", "minimum", "optimum", etc. but may also refer to the fulfillment of a termination or selection criterion like a value exceeding or falling below a threshold or other constraints leading potentially to a "sub-optimum selection" but reducing complexity and processing time.

In other words, the partitioning unit 262 may be configured to partition the block 203 into smaller block partitions or sub-blocks (which form again blocks), e.g., iteratively using quad-tree-partitioning (QT), binary partitioning (BT) or triple-tree-partitioning (TT) or any combination thereof, and to perform, e.g., the prediction for each of the block partitions or sub-blocks, wherein the mode selection comprises the selection of the tree-structure of the partitioned block 203 and the prediction modes are applied to each of the block partitions or sub-blocks.

In the following the partitioning (e.g., by partitioning unit 260) and prediction processing (by inter-prediction unit 244 and intra-prediction unit 254) performed by an example video encoder 20 will be explained in more detail.

Partitioning:

The partitioning unit 262 may partition (or split) a current block 203 into smaller partitions, e.g., smaller blocks of square or rectangular size. These smaller blocks (or sub-blocks) may be further partitioned into even smaller partitions. This is also referred to tree-partitioning or hierarchical tree-partitioning, wherein a root block, e.g., at root tree-level 0 (hierarchy-level 0, depth 0), may be recursively partitioned, e.g., partitioned into two or more blocks of a next lower tree-level, e.g., nodes at tree-level 1 (hierarchy-level 1, depth 1), wherein these blocks may be again partitioned into two or more blocks of a next lower level, e.g., tree-level 2 (hierarchy-level 2, depth 2), etc. until the partitioning is terminated, e.g., because a termination criterion is fulfilled, e.g., a maximum tree depth or minimum block size is reached. Blocks which are not further partitioned are also referred to as leaf-blocks or leaf nodes of the tree. A tree using partitioning into two partitions is referred to as binary-tree (BT), a tree using partitioning into three partitions is referred to as ternary-tree (TT), and a tree using partitioning into four partitions is referred to as quad-tree (QT).

As mentioned before, the term "block" as used herein may be a portion, in particular a square or rectangular portion, of a picture. With reference, for example, to HEVC and VVC, the block may be or correspond to a coding tree unit (CTU), a coding unit (CU), prediction unit (PU), and transform unit (TU) and/or to the corresponding blocks, e.g., a coding tree block (CTB), a coding block (CB), a transform block (TB) or prediction block (PB).

For example, a coding tree unit (CTU) may be or comprise a CTB of luma samples, two corresponding CTBs of chroma samples of a picture that has three sample arrays, or a CTB of samples of a monochrome picture or a picture that is coded using three separate colour planes and syntax structures used to code the samples. Correspondingly, a coding tree block (CTB) may be an N×N block of samples for some value of N such that the division of a component into CTBs is a partitioning. A coding unit (CU) may be or comprise a coding block of luma samples, two corresponding coding blocks of chroma samples of a picture that has three sample arrays, or a coding block of samples of a monochrome picture or a picture that is coded using three separate colour planes and syntax structures used to code the samples. Correspondingly a coding block (CB) may be an M×N block of samples for some values of M and N such that the division of a CTB into coding blocks is a partitioning.

In embodiments, e.g., according to HEVC, a coding tree unit (CTU) may be split into CUs by using a quad-tree structure denoted as coding tree. The decision whether to code a picture area using inter-picture (temporal) or intra-picture (spatial) prediction is made at the CU level. Each CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quadtree structure similar to the coding tree for the CU.

In embodiments, e.g., according to the latest video coding standard currently in development, which is referred to as VVC, quad-tree and binary tree (QTBT) partitioning is used to partition a coding block. In the QTBT block structure, a CU can have either a square or rectangular shape. For example, a coding tree unit (CTU) is first partitioned by a quadtree structure. The quadtree leaf nodes are further partitioned by a binary tree or ternary (or triple) tree structure. The partitioning tree leaf nodes are called coding units (CUs), and that segmentation is used for prediction and transform processing without any further partitioning. This means that the CU, PU and TU have the same block size in the QTBT coding block structure. In parallel, multiple partition, for example, triple tree partition was also proposed to be used together with the QTBT block structure.

In one example, the mode selection unit 260 of video encoder 20 may be configured to perform any combination of the partitioning techniques described herein.

As described above, the video encoder 20 is configured to determine or select the best or an optimum prediction mode from a set of (pre-determined) prediction modes. The set of prediction modes may comprise, e.g., intra-prediction modes and/or inter-prediction modes.

Intra-Prediction:

The set of intra-prediction modes may comprise 35 different intra-prediction modes, e.g., non-directional modes like DC (or mean) mode and planar mode, or directional modes, e.g., as defined in HEVC, or may comprise 67 different intra-prediction modes, e.g., non-directional modes like DC (or mean) mode and planar mode, or directional modes, e.g., as defined for VVC.

The intra-prediction unit 254 is configured to use reconstructed samples of neighboring blocks of the same current picture to generate an intra-prediction block 265 according to an intra-prediction mode of the set of intra-prediction modes.

The intra prediction unit 254 (or in general the mode selection unit 260) is further configured to output intra-prediction parameters (or in general information indicative of the selected intra prediction mode for the block) to the entropy encoding unit 270 in form of syntax elements 266 for inclusion into the encoded picture data 21, so that, e.g., the video decoder 30 may receive and use the prediction parameters for decoding.

Inter-Prediction:

The set of (or possible) inter-prediction modes depends on the available reference pictures (i.e. previous at least partially decoded pictures, e.g., stored in DBP 230) and other inter-prediction parameters, e.g., whether the whole reference picture or only a part, e.g., a search window area around the area of the current block, of the reference picture is used for searching for a best matching reference block, and/or e.g., whether pixel interpolation is applied, e.g., half/semi-pel and/or quarter-pel interpolation, or not.

Additional to the above prediction modes, skip mode and/or direct mode may be applied.

The inter prediction unit 244 may include a motion estimation (ME) unit and a motion compensation (MC) unit (both not shown in FIG. 2). The motion estimation unit may be configured to receive or obtain the picture block 203 (current picture block 203 of the current picture 17) and a decoded picture 231, or at least one or a plurality of previously reconstructed blocks, e.g., reconstructed blocks of one or a plurality of other/different previously decoded pictures 231, for motion estimation. E.g., a video sequence may comprise the current picture and the previously decoded pictures 231, or in other words, the current picture and the previously decoded pictures 231 may be part of or form a sequence of pictures forming a video sequence.

The encoder 20 may, e.g., be configured to select a reference block from a plurality of reference blocks of the same or different pictures of the plurality of other pictures and provide a reference picture (or reference picture index) and/or an offset (spatial offset) between the position (x, y coordinates) of the reference block and the position of the current block as inter prediction parameters to the motion estimation unit. This offset is also called motion vector (MV).

The motion compensation unit is configured to obtain, e.g., receive, an inter prediction parameter and to perform inter prediction based on or using the inter prediction parameter to obtain an inter prediction block 265. Motion compensation, performed by the motion compensation unit, may involve fetching or generating the prediction block based on the motion/block vector determined by motion estimation, possibly performing interpolations to sub-pixel precision. Interpolation filtering may generate additional pixel samples from known pixel samples, thus potentially increasing the number of candidate prediction blocks that may be used to code a picture block. Upon receiving the motion vector for the PU of the current picture block, the motion compensation unit may locate the prediction block to which the motion vector points in one of the reference picture lists.

Motion compensation unit may also generate syntax elements associated with the blocks and the video slice for use by video decoder 30 in decoding the picture blocks of the video slice.

Entropy Coding:

The entropy encoding unit 270 is configured to apply, for example, an entropy encoding algorithm or scheme (e.g., a variable length coding (VLC) scheme, an context adaptive VLC (CAVLC) scheme, an arithmetic coding scheme, a binarization, a context adaptive binary arithmetic coding (CABAC), syntax-based CABAC (SBAC), probability interval partitioning entropy (PIPE) coding or another entropy encoding methodology or technique) or bypass (no compression) on the quantized coefficients 209, inter prediction parameters, intra prediction parameters, loop filter parameters and/or other syntax elements to obtain encoded picture data 21 which can be output via the output 272, e.g., in the form of an encoded bitstream 21, so that, e.g., the video decoder 30 may receive and use the parameters for decoding. The encoded bitstream 21 may be transmitted to video decoder 30, or stored in a memory for later transmission or retrieval by video decoder 30.

Other structural variations of the video encoder 20 can be used to encode the video stream. For example, a non-transform based encoder 20 can quantize the residual signal directly without the transform processing unit 206 for certain blocks or frames. In another implementation, an encoder 20 can have the quantization unit 208 and the inverse quantization unit 210 combined into a single unit.

Decoder and Decoding Method:

FIG. 3 shows an example of a video decoder 30 that is configured to implement the techniques of this present application. The video decoder 30 is configured to receive encoded picture data 21 (e.g., encoded bitstream 21), e.g., encoded by encoder 20, to obtain a decoded picture 331. The encoded picture data or bitstream comprises information for decoding the encoded picture data, e.g., data that represents picture blocks of an encoded video slice and associated syntax elements.

In the example of FIG. 3, the decoder 30 comprises an entropy decoding unit 304, an inverse quantization unit 310, an inverse transform processing unit 312, a reconstruction unit 314 (e.g., a summer 314), a loop filter 320, a DBP 330, an inter prediction unit 344 and an intra prediction unit 354. Inter prediction unit 344 may be or include a motion compensation unit. Video decoder 30 may, in some examples, perform a decoding pass generally reciprocal to the encoding pass described with respect to video encoder 100 from FIG. 2.

As explained with regard to the encoder 20, the inverse quantization unit 210, the inverse transform processing unit 212, the reconstruction unit 214 the loop filter 220, the DPB 230, the inter prediction unit 344 and the intra prediction unit 354 are also referred to as forming the "built-in decoder" of video encoder 20. Accordingly, the inverse quantization unit 310 may be identical in function to the inverse quantization unit 110, the inverse transform processing unit 312 may be identical in function to the inverse transform processing unit 212, the reconstruction unit 314 may be identical in function to reconstruction unit 214, the loop filter 320 may be identical in function to the loop filter 220, and the DPB 330 may be identical in function to the DPB 230. Therefore, the explanations provided for the respective units and functions of the video 20 encoder apply correspondingly to the respective units and functions of the video decoder 30.

Entropy Decoding:

The entropy decoding unit 304 is configured to parse the bitstream 21 (or in general encoded picture data 21) and perform, for example, entropy decoding to the encoded picture data 21 to obtain, e.g., quantized coefficients 309 and/or decoded coding parameters (not shown in FIG. 3), e.g., any or all of inter prediction parameters (e.g., reference picture index and motion vector), intra prediction parameter (e.g., intra prediction mode or index), transform parameters, QPs, loop filter parameters, and/or other syntax elements. Entropy decoding unit 304 maybe configured to apply the decoding algorithms or schemes corresponding to the encoding schemes as described with regard to the entropy encoding unit 270 of the encoder 20. Entropy decoding unit 304 may be further configured to provide inter prediction parameters, intra prediction parameter and/or other syntax elements to the mode selection unit 360 and other parameters to other units of the decoder 30. Video decoder 30 may receive the syntax elements at the video slice level and/or the video block level.

Inverse Quantization:

The inverse quantization unit 310 may be configured to receive QPs (or in general information related to the inverse quantization) and quantized coefficients from the encoded picture data 21 (e.g., by parsing and/or decoding, e.g., by entropy decoding unit 304) and to apply based on the QPs an inverse quantization on the decoded quantized coefficients 309 to obtain dequantized coefficients 311, which may also be referred to as transform coefficients 311. The inverse quantization process may include use of a QP determined by video encoder 20 for each video block in the video slice to determine a degree of quantization and, likewise, a degree of inverse quantization that should be applied.

Inverse Transform:

Inverse transform processing unit 312 may be configured to receive dequantized coefficients 311, also referred to as transform coefficients 311, and to apply a transform to the dequantized coefficients 311 in order to obtain reconstructed residual blocks 213 in the sample domain. The reconstructed residual blocks 213 may also be referred to as transform blocks 313. The transform may be an inverse transform, e.g., an inverse DCT, an inverse DST, an inverse integer transform, or a conceptually similar inverse transform process. The inverse transform processing unit 312 may be further configured to receive transform parameters or corresponding information from the encoded picture data 21 (e.g., by parsing and/or decoding, e.g., by entropy decoding unit 304) to determine the transform to be applied to the dequantized coefficients 311.

Reconstruction:

The reconstruction unit 314 (e.g., adder or summer 314) may be configured to add the reconstructed residual block 313, to the prediction block 365 to obtain a reconstructed block 315 in the sample domain, e.g., by adding the sample values of the reconstructed residual block 313 and the sample values of the prediction block 365.

Filtering:

The loop filter unit 320 (either in the coding loop or after the coding loop) is configured to filter the reconstructed block 315 to obtain a filtered block 321, e.g., to smooth pixel transitions, or otherwise improve the video quality. The loop filter unit 320 may comprise one or more loop filters such as a de-blocking filter, an SAO filter or one or more other filters, e.g., a bilateral filter, an ALF, a sharpening, a smoothing filters or a collaborative filters, or any combination thereof. Although the loop filter unit 320 is shown in FIG. 3 as being an in loop filter, in other configurations, the loop filter unit 320 may be implemented as a post loop filter.

DPB:

The decoded video blocks 321 of a picture are then stored in DPB 330, which stores the decoded pictures 331 as reference pictures for subsequent motion compensation for other pictures and/or for output respectively display.

The decoder 30 is configured to output the decoded picture 311, e.g., via output 312, for presentation or viewing to a user.

Prediction:

The inter prediction unit 344 may be identical to the inter prediction unit 244 (in particular to the motion compensation unit) and the intra prediction unit 354 may be identical to the inter prediction unit 254 in function, and performs split or partitioning decisions and prediction based on the partitioning and/or prediction parameters or respective information received from the encoded picture data 21 (e.g., by parsing and/or decoding, e.g., by entropy decoding unit 304). Mode selection unit 360 may be configured to perform the prediction (intra or inter prediction) per block based on reconstructed pictures, blocks or respective samples (filtered or unfiltered) to obtain the prediction block 365.

When the video slice is coded as an intra coded (I) slice, intra prediction unit 354 of mode selection unit 360 is configured to generate prediction block 365 for a picture block of the current video slice based on a signaled intra prediction mode and data from previously decoded blocks of the current picture. When the video picture is coded as an inter coded (i.e., B, or P) slice, inter prediction unit 344 (e.g., motion compensation unit) of mode selection unit 360 is configured to produce prediction blocks 365 for a video block of the current video slice based on the motion vectors and other syntax elements received from entropy decoding unit 304. For inter prediction, the prediction blocks may be produced from one of the reference pictures within one of the reference picture lists. Video decoder 30 may construct the reference frame lists, list 0 and list 1, using default construction techniques based on reference pictures stored in DPB 330.

Mode selection unit 360 is configured to determine the prediction information for a video block of the current video slice by parsing the motion vectors and other syntax elements, and uses the prediction information to produce the prediction blocks for the current video block being decoded. For example, the mode selection unit 360 uses some of the received syntax elements to determine a prediction mode (e.g., intra or inter prediction) used to code the video blocks of the video slice, an inter prediction slice type (e.g., B slice, P slice, or generalized PB (GPB) slice), construction information for one or more of the reference picture lists for the slice, motion vectors for each inter encoded video block of the slice, inter prediction status for each inter coded video block of the slice, and other information to decode the video blocks in the current video slice.

Other variations of the video decoder 30 can be used to decode the encoded picture data 21. For example, the decoder 30 can produce the output video stream without the loop filtering unit 320. For example, a non-transform based decoder 30 can inverse-quantize the residual signal directly without the inverse-transform processing unit 312 for certain blocks or frames. In another implementation, the video decoder 30 can have the inverse-quantization unit 310 and the inverse-transform processing unit 312 combined into a single unit.

It should be understood that, in the encoder 20 and the decoder 30, a processing result of a current step may be further processed and then output to the next step. For example, after interpolation filtering, motion vector derivation or loop filtering, a further operation, such as Clip or shift, may be performed on the processing result of the interpolation filtering, motion vector derivation or loop filtering.

It should be noted that further operations may be applied to the derived motion vectors of current block (including but not limit to control point motion vectors of affine mode, sub-block motion vectors in affine, planar, ATMVP modes, temporal motion vectors, and so on). For example, the value of motion vector is constrained to a predefined range according to its representing bit. If the representing bit of motion vector is bitDepth, then the range is $-2^{(bitDepth-1)} \sim 2^{(bitDepth-1)}-1$, where "^" means exponentiation. For example, if bitDepth is set equal to 16, the range is $-32768 \sim 32767$; if bitDepth is set equal to 18, the range is $-131072 \sim 131071$. For example, the value of the derived motion vector (MV) (e.g., the MVs of four 4×4 sub-blocks within one 8×8 block) is constrained such that the max difference between integer parts of the four 4×4 sub-block MVs is no more than N pixels, such as no more than 1 pixel. Following includes two methods for constraining the motion vector according to the bitDepth.

Method 1: remove the overflow most significant bit (MSB) by flowing operations:

$$ux=(mvx+2^{bitDepth})\%2^{bitDepth} \quad (1)$$

$$mvx=(ux>=2^{bitDepth-1})?(ux-2^{bitDepth}):ux, \quad (2)$$

$$uy=(mvy+2^{bitDepth})\%2^{bitdepth}, \text{ and} \quad (3)$$

$$mvy=(uy>=2^{bitDepth-1})?(uy-2^{bitDepth}):uy, \quad (4)$$

where mvx is a horizontal component of a motion vector of an image block or a sub-block, mvy is a vertical component of a motion vector of an image block or a sub-block, and ux and uy indicates an intermediate value.

For example, if the value of mvx is −32769, after applying formula (1) and (2), the resulting value is 32767. In computer system, decimal numbers are stored as two's complement. The two's complement of −32769 is 1,0111,1111, 1111,1111 (17 bits), then the MSB is discarded, so the resulting two's complement is 0111,1111,1111,1111 (decimal number is 32767), which is same as the output by applying formula (1) and (2).

$$ux=(mvpx+mvdx+2^{bitDepth})\%2^{bitDepth}, \quad (5)$$

$$mvx=(ux>=2^{bitDepth-1})?(ux-2^{bitDepth}):ux, \quad (6)$$

$$uy=(mvpy+mvdy+2^{bitDepth})\%2^{bitDepth}, \text{ and} \quad (7)$$

$$mvy=(uy>=2^{bitDepth-1})?(uy-2^{bitDepth})uy, \quad (8)$$

The operations may be applied during the sum of mvp and mvd, as shown in formula (5) to (8).

Method 2: remove the overflow MSB by clipping the value:

$$vx=Clip3(-2^{bitDepth-1}, 2^{bitDepth-1}-1, vx), \text{ and}$$

$$vy=Clip3(-2^{bitDepth-1}, 2^{bitDepth-1}-1, vy)$$

where vx is a horizontal component of a motion vector of an image block or a sub-block, vy is a vertical component of a motion vector of an image block or a sub-block, x, y and z respectively correspond to three input value of the MV clipping process, and the definition of function Clip3 is as follow:

$$Clip3(x, y, z) = \begin{cases} x; & z < x \\ y; & z > y \\ z; & \text{otherwise} \end{cases}$$

Figure 4:
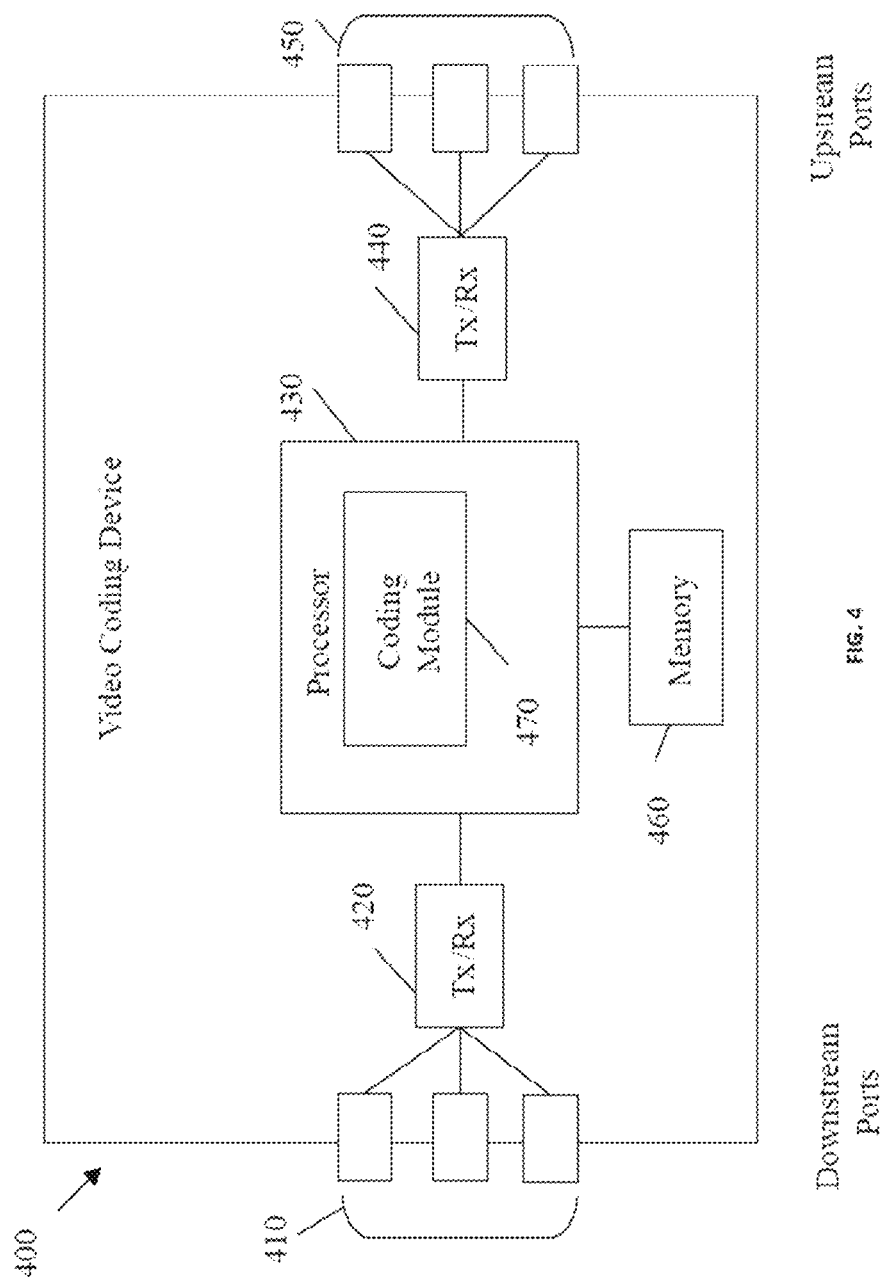
FIG. 4 is a block diagram illustrating an example of an encoding apparatus or a decoding apparatus.

FIG. 4 is a schematic diagram of a video coding device 400 according to an embodiment of the disclosure. The video coding device 400 is suitable for implementing the disclosed embodiments as described herein. In an embodiment, the video coding device 400 may be a decoder such as video decoder 30 of FIG. 1A or an encoder such as video encoder 20 of FIG. 1A.

The video coding device 400 comprises ingress ports 410 (or input ports 410) and receiver units (Rx) 420 for receiving data, a processor, logic unit, or central processing unit (CPU) 430 to process the data, transmitter units (Tx) 440 and egress ports 450 (or output ports 450) for transmitting the data, and a memory 460 for storing the data. The video coding device 400 may also comprise optical-to-electrical (OE) components and electrical-to-optical (EO) components coupled to the ingress ports 410, the receiver units 420, the transmitter units 440, and the egress ports 450 for egress or ingress of optical or electrical signals.

The processor 430 is implemented by hardware and software. The processor 430 may be implemented as one or more CPU chips, cores (e.g., as a multi-core processor), FPGAs, ASICs, and DSPs. The processor 430 is in communication with the ingress ports 410, receiver units 420, transmitter units 440, egress ports 450, and memory 460. The processor 430 comprises a coding module 470. The coding module 470 implements the disclosed embodiments described above. For instance, the coding module 470 implements, processes, prepares, or provides the various coding operations. The inclusion of the coding module 470 therefore provides a substantial improvement to the functionality of the video coding device 400 and effects a transformation of the video coding device 400 to a different state. Alternatively, the coding module 470 is implemented as instructions stored in the memory 460 and executed by the processor 430.

The memory 460 may comprise one or more disks, tape drives, and solid-state drives and may be used as an overflow data storage device, to store programs when such programs are selected for execution, and to store instructions and data that are read during program execution. The memory 460 may be, for example, volatile and/or non-volatile and may be a read-only memory (ROM), RAM, ternary content-addressable memory (TCAM), and/or static RAM (SRAM).

Figure 5:
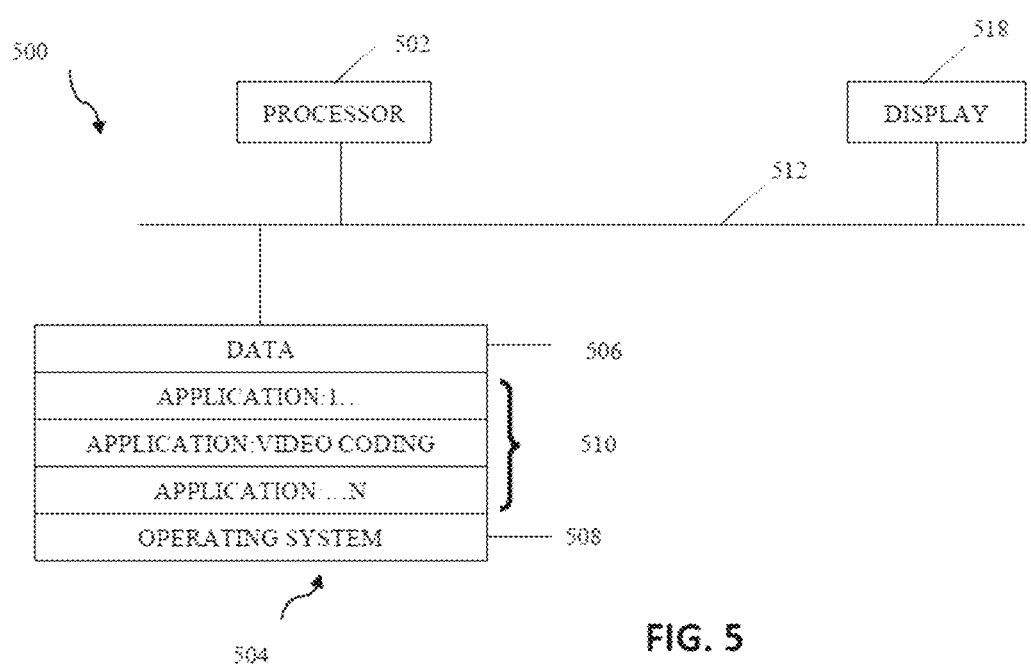
FIG. 5 is a block diagram illustrating another example of an encoding apparatus or a decoding apparatus.

FIG. 5 is a simplified block diagram of an apparatus 500 that may be used as either or both of the source device 12 and the destination device 14 from FIG. 1 according to an exemplary embodiment.

A processor 502 in the apparatus 500 can be a central processing unit. Alternatively, the processor 502 can be any other type of device, or multiple devices, capable of manipulating or processing information now-existing or hereafter developed. Although the disclosed implementations can be practiced with a single processor as shown, e.g., the processor 502, advantages in speed and efficiency can be achieved using more than one processor.

A memory 504 in the apparatus 500 can be a ROM device or a RAM device in an implementation. Any other suitable type of storage device can be used as the memory 504. The memory 504 can include code and data 506 that is accessed by the processor 502 using a bus 512. The memory 504 can further include an operating system 508 and application programs 510, the application programs 510 including at least one program that permits the processor 502 to perform the methods described here. For example, the application programs 510 can include applications 1 through N, which further include a video coding application that performs the methods described here.

The apparatus 500 can also include one or more output devices, such as a display 518. The display 518 may be, in one example, a touch sensitive display that combines a display with a touch sensitive element that is operable to sense touch inputs. The display 518 can be coupled to the processor 502 via the bus 512.

Although depicted here as a single bus, the bus 512 of the apparatus 500 can be composed of multiple buses. Further, the secondary storage 514 can be directly coupled to the other components of the apparatus 500 or can be accessed via a network and can comprise a single integrated unit such as a memory card or multiple units such as multiple memory cards. The apparatus 500 can thus be implemented in a wide variety of configurations.

In-Loop Filter:

There are totally three in loop filters in VTM3. Besides deblocking filter and SAO (the two loop filters in HEVC), ALF are applied in the VTM3. The order of the filtering process in the VTM3 is the deblocking filter, SAO and ALF.

ALF:

In the VTM5, an ALF with block-based filter adaption is applied. For the luma component, one among 25 filters is selected for each 4×4 block, based on the direction and activity of local gradients.

Figure 6:
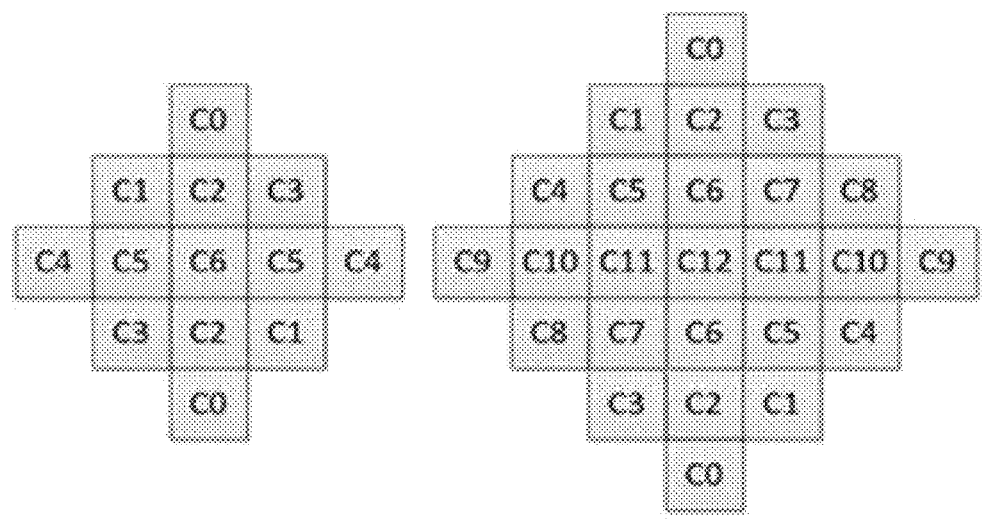
FIG. 6 illustrates ALF filter shapes, chroma 5×5 diamond, luma 7×7 diamond.

Filter Shape:

In the joint exploration model (JEM), two diamond filter shapes (as shown in FIG. 6) are used. for the luma component. The 7×7 diamond shape is applied for luma component and the 5×5 diamond shape applied for chroma component.

Block Classification:

For luma component, each 4×4 block is categorized into one out of 25 classes. The classification index C is derived based on its directionality D and a quantized value of activity $\hat{A}$, as follows:

$$C=5D+\hat{A} \qquad (9)$$

To calculate D and A, gradients of the horizontal, vertical and two diagonal direction are first calculated using 1-D Laplacian:

$$g_v = \sum_{k=i-2}^{i+3}\sum_{l=j-2}^{j+3} V_{k,l},\ V_{k,l} = |2R(k, l) - R(k, l-1) - R(k, l+1)|, \qquad (10)$$

$$g_h = \sum_{k=i-2}^{i+3}\sum_{l=j-2}^{j+3} H_{k,l},\ H_{k,l} = |2R(k, l) - R(k-1, l) - R(k+1, l)|, \qquad (11)$$

$$g_{d1} = \sum_{k=i-2}^{i+3}\sum_{l=j-2}^{j+3} D1_{k,l}, \qquad (12)$$

$$D1_{k,l} = |2R(k, l) - R(k-1, l-1) - R(k+1, l+1)|, \text{ and}$$

$$g_{d2} = \sum_{k=i-2}^{i+3}\sum_{j=j-2}^{j+3} D2_{k,l}, \qquad (13)$$

$$D2_{k,l} = |2R(k, l) - R(k-1, l+1) - R(k+1, l-1)|$$

where indices i and j refer to the coordinates of the upper left sample within the 4×4 block and R(i,j) indicates a reconstructed sample at coordinate (i,j).

Figure 7:
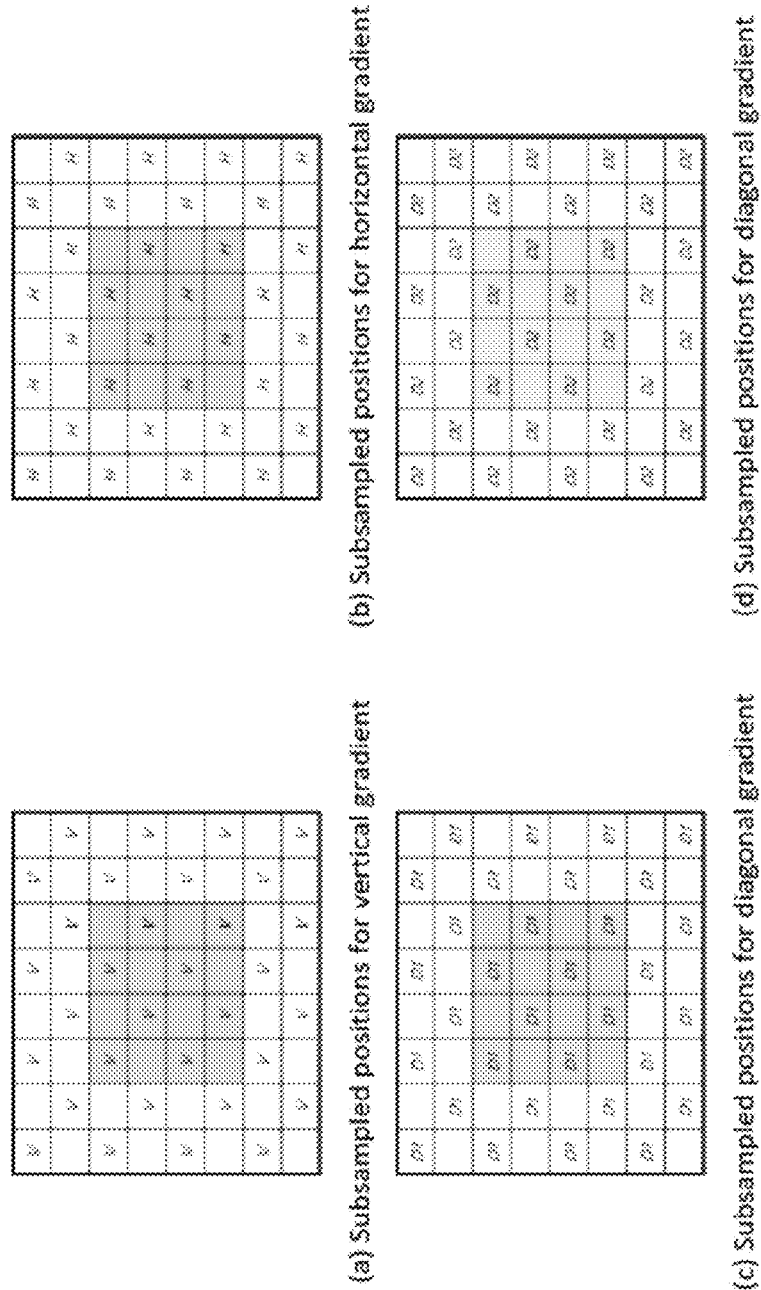
FIG. 7 illustrates subsampled ALF block classification.

To reduce the complexity of block classification, the subsampled one-dimensional (1-D) Laplacian calculation is applied. As shown in FIG. 7, the same subsampled positions are used for gradient calculation of all directions.

Then D maximum and minimum values of the gradients of horizontal and vertical directions are set as:

$$g_{h,v}^{max}=\max(g_h,g_v), g_{h,v}^{min}=\min(g_h,g_v) \qquad (14)$$

The maximum and minimum values of the gradient of two diagonal directions are set as:

$$g_{d0,d1}^{max}=\max(g_{d0},g_{d1}), g_{d0,d1}^{min}=\min(g_{d0},g_{d1}) \qquad (15)$$

To derive the value of the directionality D, these values are compared against each other and with two thresholds $t_1$ and $t_2$:

Step 1. If both $g_{h,v}^{max} \leq t_1 \cdot g_{h,v}^{min}$ and $g_{d0,d1}^{max} \leq t_1 \cdot g_{d0,d1}^{min}$ are true, D is set to 0.

Step 2. If $g_{h,v}^{max}/g_{h,v}^{min} > g_{d0,d1}^{max}/g_{d0,d1}^{min}$, continue from Step 3, otherwise continue from Step 4.

Step 3. If $g_{h,v}^{max} > t_2 \cdot g_{h,v}^{min}$, D is set to 2, otherwise D is set to 1.

Step 4. If $g_{d0,d1}^{max} > t_2 \cdot g_{d0,d1}^{min}$, D is set to 4, otherwise D is set to 3.

The activity value A is calculated as:

$$A = \sum_{k=i-2}^{i+3} \sum_{l=j-2}^{j+3} (V_{k,l} + H_{k,l}) \quad (16)$$

A is further quantized to the range of 0 to 4, inclusively, and the quantized value is denoted as Â.

For chroma components in a picture, no classification method is applied, i.e. a single set of ALF coefficients is applied for each chroma component.

Geometric Transformations of Filter Coefficients:

Before filtering each 4×4 luma block, geometric transformations such as rotation or diagonal and vertical flipping are applied to the filter coefficients f(k,l) depending on gradient values calculated for that block. This is equivalent to applying these transformations to the samples in the filter support region. The idea is to make different blocks to which ALF is applied more similar by aligning their directionality.

Three geometric transformations, including diagonal, vertical flip and rotation are introduced:

Diagonal: $f_D(k,l) = f(l,k)$, (17)

Vertical flip: $f_V(k,l) = f(k, K-l-1)$, and (18)

Rotation: $f_R(k,l) = f(K-l-1, k)$, (19)

where K is the size of the filter and $0 \leq k, l \leq K-1$ are coefficients coordinates, such that location (0,0) is at the upper left corner and location (K−1, K−1) is at the lower right corner. The transformations are applied to the filter coefficients f (k, l) depending on gradient values calculated for that block. The relationship between the transformation and the four gradients of the four directions are summarized in the following table.

TABLE 1

Mapping of the gradient calculated for one block and the transformations

| Gradient values | Transformation |
|---|---|
| $g_{d2} < g_{d1}$ and $g_h < g_v$ | No transformation |
| $g_{d2} < g_{d1}$ and $g_v < g_h$ | Diagonal |
| $g_{d1} < g_{d2}$ and $g_h < g_v$ | Vertical flip |
| $g_{d1} < g_{d2}$ and $g_v < g_h$ | Rotation |

Filter Parameters Signalling:

In the VTM3, ALF filter parameters are signalled in the slice header. Up to 25 sets of luma filter coefficients could be signalled. To reduce bits overhead, filter coefficients of different classification can be merged.

The filtering process can be controlled at CTB level. A flag is always signalled to indicate whether ALF is applied to a luma CTB. For each chroma CTB, a flag might be signalled to indicate whether ALF is applied to a chroma CTB depends on the value of alf_chroma_ctb_present_flag.

The filter coefficients are quantized with norm equal to 128. To further restrict the multiplication complexity, a bitstream conformance is applied that the coefficient value of the central position shall be in the range of 0 to $2^8$ and he coefficient values of the remaining positions shall be in the range of $-2^7$ to $2^7-1$, inclusive.

Filtering Process:

At decoder side, when ALF is enabled for a CTB, each sample R(i,j) within the CU is filtered, resulting in sample value R'(i,j) as shown below, where L denotes filter length, $f_{m,n}$ represents filter coefficient, and f(k,l) denotes the decoded filter coefficients.

$$R'(i, j) = \left( \sum_{k=-\frac{L}{2}}^{\frac{L}{2}} \sum_{l=-\frac{L}{2}}^{\frac{L}{2}} f(k, l) \times R(i+k, j+l) + 64 \right) \gg 7 \quad (20)$$

or the filtering can also be expressed as:

$$O(x,y) = \Sigma_{(i,j)} w(i,j) \cdot I(x+i, y+j), \quad (21)$$

where samples I(x+i,y+j) are input samples, O(x,y) is the filtered output sample (i.e. filter result), and w(i,j) denotes the filter coefficients where samples I(x+i,y+j) are input samples, O(x,y) is the filtered output sample (i.e. filter result), and w(i,j) denotes the filter coefficients. In practice, in VTM it is implemented using integer arithmetic for fixed point precision computations:

$$O(x, y) = \left( \sum_{i=-\frac{L}{2}}^{\frac{L}{2}} \sum_{j=-\frac{L}{2}}^{\frac{L}{2}} w(i, j) \cdot I(x+i, y+j) + 64 \right) \gg 7, \quad (22)$$

where L denotes the filter length, and where w(i,j) are the filter coefficients in fixed point precision.

From VTM5 onwards (ITU JVET-N0242), ALF is performed in a non-linear way. The equation 21 can be formulated as follows:

$$O(x,y) = I(x,y) + \Sigma_{(i,j) \neq (0,0)} w(i,j) \cdot (I(x+i, y+j) - I(x,y)), \quad (23)$$

where w(i,j) are the same filter coefficients as in equation (22) [excepted w(0, 0) which is equal to 1 in equation (23) while it is equal to $1 - \Sigma_{(i,j) \neq (0,0)} w(i,j)$ in equation (21)].

The filter is further modified by introducing non-linearity to make ALF more efficient by using a clipping function to reduce the impact of neighbor sample values ((I(x+i,y+j)) when they are too different with the current sample value (I(x,y)) being filtered.

In VTM5, the ALF filter is modified as follows:

$$O'(x,y) = I(x,y) + \Sigma_{(i,j) \neq (0,0)} w(i,j) \cdot K(I(x+i, y+j) - I(x,y), k(i, j)), \quad (24)$$

where K(d,b)=min(b,max(−b,d)) is the clipping function, and k(i,j) are clipping parameters, which depends on the (i,j) filter coefficient. The clipping parameters k(i,j) are specified for each ALF filter, one clipping value is signaled per filter coefficient. It means that up to 12 clipping values can be signalled in the bitstream per Luma filter and up to 6 clipping values for the Chroma filter.

In order to limit the signaling cost and the encoder complexity, the evaluation of the clipping values is reduced to a small set of possible values. In VTM5, only 4 possible fixed values are used which are the same for inter and intra tile groups.

Because the variance of the local differences is often higher for luma than for chroma, two different sets of clipping values for the luma and chroma filters are used. The clipping values also include the maximum sample value (here 1024 for 10 bits bit-depth) in each set, so that clipping can be disabled if it is not necessary.

The sets of clipping values used in VTM5 are provided in the Table 2. The 4 values have been selected by roughly equally splitting, in the logarithmic domain, the full range of the sample values (coded on 10 bits) for luma, and the range from 4 to 1024 for chroma.

More precisely, the luma table of clipping values have been obtained by the following formula:

$$AlfClip_L = \left\{ \text{round}\left( \left( (M)^{\frac{1}{N}} \right)^{N-n+1} \right) \text{ for } n \in 1 \ldots N \right\},$$

with $M = 2^{10}$ and $N = 4$.

Similarly, the Chroma tables of clipping values is obtained according to the following formula:

$$AlfClip_C = \left\{ \text{round}\left( A \cdot \left( \left( \frac{M}{A} \right)^{\frac{1}{N-1}} \right)^{N-n} \right) \text{ for } n \in 1 \ldots N \right\},$$

with $M = 2^{10}$, $N = 4$ and $A = 4$.

TABLE 2

| Authorized clipping values | |
|---|---|
| | Intra/Inter tile group |
| Luma | {1024, 181, 32, 6} |
| Chroma | {1024, 161, 25, 4} |

Another In-Loop Filter:

There are totally three in-loop filters in VVC. Besides deblocking filter and SAO (the two loop filters in HEVC), ALF are applied. The ALF comprises of luma ALF, chroma ALF and cross-component ALF (CC-ALF). The ALF filtering process is designed so that luma ALF, chroma ALF and CC-ALF can be executed in parallel. The order of the filtering process in the VVC is the deblocking filter, SAO and ALF. The SAO in VVC is the same as that in HEVC.

In VVC, a new process called the luma mapping with chroma scaling was added (this process was previously known as the adaptive in-loop reshaper). The luma mapping with chroma scaling (LMCS) modifies the sample values before encoding and after reconstruction by redistributing the codewords across the entire dynamic range. This new process is performed before deblocking.

ALF:

In VVC, an ALF with block-based filter adaption is applied. For the luma component, one among 25 filters is selected for each 4×4 block, based on the direction and activity of local gradients.

Filter Shape:

Two diamond filter shapes (as shown in FIG. 6) are used. The 7×7 diamond shape is applied for luma component and the 5×5 diamond shape is applied for chroma components.

Block Classification:

For luma component, each 4×4 block is categorized into one out of 25 classes. The classification index C is derived based on its directionality D and a quantized value of activity $\hat{A}$, as follows:

$$C = 5D + \hat{A} \quad (9)$$

To calculate D and $\hat{A}$, gradients of the horizontal, vertical and two diagonal direction are first calculated using 1-D Laplacian:

$$g_v = \sum_{k=i-2}^{i+3} \sum_{l=j-2}^{j+3} V_{k,l}, \; V_{k,l} = |2R(k,l) - R(k,l-1) - R(k,l+1)|, \quad (10)$$

$$g_h = \sum_{k=i-2}^{i+3} \sum_{l=j-2}^{j+3} H_{k,l}, \; H_{k,l} = |2R(k,l) - R(k-1,l) - R(k+1,l)|, \quad (11)$$

$$g_{d1} = \sum_{k=i-2}^{i+3} \sum_{l=j-3}^{j+3} D1_{k,l}, \quad (12)$$

$$D1_{k,l} = |2R(k,l) - R(k-1,l-1) - R(k+1,l+1)|, \text{ and}$$

$$g_{d2} = \sum_{k=i-2}^{i+3} \sum_{j=j-2}^{j+3} D2_{k,l}, \quad (13)$$

$$D2_{k,l} = |2R(k,l) - R(k-1,l+1) - R(k+1,l-1)|,$$

where indices i and j refer to the coordinates of the upper left sample within the 4×4 block and R(i,j) indicates a reconstructed sample at coordinate (i,j).

To reduce the complexity of block classification, the subsampled 1-D Laplacian calculation is applied. As shown in FIG. 7, the same subsampled positions are used for gradient calculation of all directions.

Then D maximum and minimum values of the gradients of horizontal and vertical directions are set as:

$$g_{h,v}^{max} = \max(g_h, g_v), g_{h,v}^{min} = \min(g_h, g_v) \quad (14)$$

The maximum and minimum values of the gradient of two diagonal directions are set as:

$$g_{d0,d1}^{max} = \max(g_{d0}, g_{d1}), g_{d0,d1}^{min} = \min(g_{d0}, g_{d1}) \quad (15)$$

To derive the value of the directionality D, these values are compared against each other and with two thresholds $t_1$ and $t_2$:

Step 1. If both $g_{h,v}^{max} \leq t_1 \cdot g_{h,v}^{min}$ and $g_{d0,d1}^{max} \leq t_1 \cdot g_{d0,d1}^{min}$ are true, D is set to 0.

Step 2. If $g_{h,v}^{max}/g_{h,v}^{min} > g_{d0,d1}^{max}/g_{d0,d1}^{min}$, continue from Step 3, otherwise continue from Step 4.

Step 3. If $g_{h,v}^{max} > t_2 \cdot g_{h,v}^{min}$, D is set to 2, otherwise D is set to 1.

Step 4. If $g_{d0,d1}^{max} > t_2 \cdot g_{d0,d1}^{min}$, D is set to 4, otherwise D is set to 3.

The activity value A is calculated as:

$$A = \sum_{k=i-2}^{i+3} \sum_{l=j-2}^{j+3} (V_{k,l} + H_{k,l}) \quad (16)$$

A is further quantized to the range of 0 to 4, inclusively, and the quantized value is denoted as $\hat{A}$.

For chroma components in a picture, no classification method is applied, i.e. a single set of ALF coefficients is applied for each chroma component.

Geometric Transformations of Filter Coefficients and Clipping Values:

Before filtering each 4×4 luma block, geometric transformations such as rotation or diagonal and vertical flipping are applied to the filter coefficients f(k,l) and to the corresponding filter clipping values c(k,l) depending on gradient values calculated for that block. This is equivalent to applying these transformations to the samples in the filter support region. The idea is to make different blocks to which ALF is applied more similar by aligning their directionality.

Three geometric transformations, including diagonal, vertical flip and rotation are introduced:

Diagonal: $f_D(k,l) = f(l,k), c_D(k,l) = c(l,k),$ (25)

Vertical flip: $f_V(k,l) = f(k, K-l-1), c_V(k,l) = c(k, K-l-1),$
and (26)

Rotation: $f_R(k,l) = f(K-l-1, k), c_R(k,l) = c(K-l-1, k),$ (27)

where K is the size of the filter and $0 \leq k, l \leq K-1$ are coefficients coordinates, such that location (0,0) is at the upper left corner and location (K-1, K-1) is at the lower right corner. The transformations are applied to the filter coefficients f(k,l) and to the clipping values c(k,l) depending on gradient values calculated for that block. The relationship between the transformation and the four gradients of the four directions are summarized in the following Table 3.

TABLE 3

Mapping of the gradient calculated for one block and the transformations

| Gradient values | Transformation |
|---|---|
| $g_{d2} < g_{d1}$ and $g_h < g_v$ | No transformation |
| $g_{d2} < g_{d1}$ and $g_v < g_h$ | Diagonal |
| $g_{d1} < g_{d2}$ and $g_h < g_v$ | Vertical flip |
| $g_{d1} < g_{d2}$ and $g_v < g_h$ | Rotation |

Filter Parameters Signalling:

ALF filter parameters are signalled in adaptation parameter set (APS). In one APS, up to 25 sets of luma filter coefficients and clipping value indexes, and up to eight sets of chroma filter coefficients and clipping value indexes could be signalled. To reduce bits overhead, filter coefficients of different classification for luma component can be merged. In slice header, the indices of the APSs used for the current slice are signaled.

Clipping value indexes, which are decoded from the APS, allow determining clipping values using a table of clipping values for both luma and chroma components. These clipping values are dependent of the internal bitdepth. More precisely, the clipping values are obtained by the following formula:

$$\text{AlfClip} = \{\text{round}(2^{B-\alpha*n}) \text{ for } n \in [0 \ldots N-1]\}, \quad (28)$$

with B equal to the internal bitdepth, α is a pre-defined constant value equal to 2.35, and N equal to 4 which is the number of allowed clipping values in VVC. The AlfClip is then rounded to the nearest value with the format of power of 2.

In slice header, up to 7 APS indices can be signaled to specify the luma filter sets that are used for the current slice. The filtering process can be further controlled at CTB level. A flag is always signalled to indicate whether ALF is applied to a luma CTB. A luma CTB can choose a filter set among 16 fixed filter sets and the filter sets from APSs. A filter set index is signaled for a luma CTB to indicate which filter set is applied. The 16 fixed filter sets are pre-defined and hard-coded in both the encoder and the decoder.

For chroma component, an APS index is signaled in slice header to indicate the chroma filter sets being used for the current slice. At CTB level, a filter index is signaled for each chroma CTB if there is more than one chroma filter set in the APS.

The filter coefficients are quantized with norm equal to 128. In order to restrict the multiplication complexity, a bitstream conformance is applied so that the coefficient value of the non-central position shall be in the range of $-2^7$ to $2^7-1$, inclusive. The central position coefficient is not signalled in the bitstream and is considered as equal to 128.

Filtering Process:

At decoder side, when ALF is enabled for a CTB, each sample R(i,j) within the CU is filtered, resulting in sample value R'(i,j) as shown below, $$R'(i,j) = R(i,j) + ((\Sigma_{k \neq 0} \Sigma_{l \neq 0} f(k,l) \times K(R(i+k,j+l) - R(i,j), c(k,l)) + 64) >> 7), \quad (29)$$

where f(k,l) denotes the decoded filter coefficients, K(x,y) is the clipping function and c(k,l) denotes the decoded clipping parameters. The variable k and l varies between $$-\frac{L}{2}$$

and L/2 where L denotes the filter length. The clipping function K(x,y)=min(y,max(−y,x)) which corresponds to the function Clip3(−y,y,x). The clipping operation introduces non-linearity to make ALF more efficient by reducing the impact of neighbor sample values that are too different with the current sample value.

The selected clipping values are coded in the "alf_data" syntax element by using a Golomb encoding scheme corresponding to the index of the clipping value in the above table 1. This encoding scheme is same as the encoding scheme for the filter index. The alf_data may be in a adaptation_parameter_set_rbsp( ), and the adaptation_parameter_set_rbsp( ) may be referred to by a slice header.

The syntax details are shown in the Table below.

| | Descriptor |
|---|---|
| alf_data( ) { | |
|   alf_chroma_idc | tu(v) |
|   alf_luma_clip | u(1) |
|   if( alf_choma_idc ) | |
|     alf_chroma_clip | u(1) |
|   alf_luma_num_filters_signalled_minus1 | tb(v) |
|   if( alf_luma_num_filters_signalled_minus1 > 0 ) { | |
|     for( filtIdx = 0; filtIdx < NumAlfFilters; filtIdx++ ) | |
|       alf_luma_coeff_delta_idx[ filtIdx ] | tb(v) |
|   } | |
|   alf_luma_coeff_delta_flag | u(1) |
|   if ( !alf_luma_coeff_delta_flag && alf_luma_num_filters_signalled_minus1 > 0 ) | |
|     alf_luma_coeff_delta_prediction_flag | u(1) |
|   alf_luma_min_eg_order_minus1 | ue(v) |
|   for( i = 0; i < 3; i++ ) | |
|     alf_luma_eg_order_increase_flag[ i ] | u(1) |
|   if ( alf_luma_coeff_delta_flag ) { | |
|     for( sigFiltIdx = 0; sigFiltIdx <= alf_luma_num_filters_signalled_minus1; sigFiltIdx++ ) | |
|       alf_luma_coeff_flag[ sigFiltIdx ] | u(1) |
|   } | |
|   for( sigFiltIdx = 0; sigFiltIdx <= alf_luma_num_filters_signalled_minus1; sigFiltIdx++ ) { | |
|     if ( alf_luma_coeff_flag[ sigFiltIdx ] ) { | |
|       for ( j = 0; j < 12; j++ ) { | |
|         alf_luma_coeff_delta_abs[ sigFiltIdx ][ j ] | uek(v) |
|         if( alf_luma_coeff_delta_abs[ sigFiltIdx ][ j ] ) | |
|           alf_luma_coeff_delta_sign[ sigFiltIdx ][ j ] | u(1) |
|       } | |
|     } | |
|   } | |
|   if( alf_luma_clip ) { | |
|     alf_luma_clip_min_eg_order_minus1 | ue(v) |
|     for( i = 0; i < 3; i++ ) | |
|       alf_luma_clip_eg_order_increase_flag[ i ] | u(1) |
|     for ( sigFiltIdx = 0; sigFiltIdx <= alf_luma_num_filters_signalled_minus1; sigFiltIdx++ ) { | |
|       if ( alf_luma_coeff_flag[ sigFiltIdx ] ) { | |
|         for (j = 0; j < 12; j++ ) { | |
|           if( filterCoefficients[ sigFiltIdx ][ j ] ) | |
|             alf_luma_clip_idx[ sigFiltIdx ][ j ] | uek(v) |
|         } | |
|       } | |
|     } | |
|   } | |
|   if ( alf_chroma_idc > 0 ) { | |

-continued

The syntax details are shown in the Table below.

| | Descriptor |
|---|---|
| alf_chroma_min_eg_order_minus1 | ue(v) |
| for( i = 0; i < 2; i++ ) | |
|     alf_chroma_eg_order_increase_flag[ i ] | u(1) |
| for( j = 0; j < 6; j++ ) { | |
|     alf_chroma_coeff_abs[ j ] | uek(v) |
|     if( alf_chroma_coeff_abs[ j ] > 0) | |
|         alf_chroma_coeff_sign[ j ] | u(1) |
|     } | |
| } | |
| if ( alf_chroma_idc > 0 && alf_chroma_clip ) { | |
|     alf_chroma_clip_min_eg_order_minus1 | ue(v) |
|     for( i = 0; i < 2; i++ ) | |
| alf_chroma_clip_eg_order_increase_flag[ i ] | u(1) |
|     for( j = 0; j < 6; j++ ) { | |
|         if( alf_chroma_coeff_abs[ j ] ) | |
|             alf_chroma_clip_idx[ j ] | uek(v) |
|         } | |
|     } | |
| } | |

The semantics of the newly introduced syntax elements are as follows:

alf_luma_clip equal to 0 specifies that linear ALF is applied on luma component. alf_luma_clip equal to 1 specifies that non-linear ALF may be applied on luma component.

alf_chroma_chp equal to 0 specifies that linear ALF is applied on chroma components, alf_chroma_clip equal to 1 specifies that non-linear ALF is applied on chroma component. If not present alf_chroma_clip is inferred as 0.

alf_luma_clip_min_eg_order_minus1 plus 1 specifies the minimum order of the exp-Golomb code for luma clipping indexes signalling. The value of alf_luma_clip_min_eg_order_minus1 shall be in the range of 0 to 6, inclusive.

alf_luma_clip_eg_order_increase_flag[i] equal to 1 specifies that the minimum order of the exp-Golomb code for luma clipping indexes signalling is incremented by 1. alf_luma_clip_eg_order_increase_flag[i] equal to 0 specifies that the minimum order of the exp-Golomb code for luma clipping indexes signalling is not incremented by 1.

The order expGoOrderYClip[i] of the exp-Golomb code used to decode the values of alf_luma_clip_idx[sigFiltIdx][j] is derived as follows:

expGoOrderYClip[$i$]=alf_luma_clip_min_eg_order_minus1+1+alf_luma_clip_eg_order_increase_flag[$i$].

alf_luma_clip_idx[sigFiltIdx][j] specifies the clipping index of the clipping value to use before multiplying by the j-th coefficient of the signalled luma filter indicated by sigFiltIdx. When alf_luma_clip_idx[sigFiltIdx][j] is not present, it is inferred to be equal 0 (no clipping).

The order k of the exp-Golomb binarization uek(v) is derived as follows:

golombOrderIdxYClip[ ]={0,0,1,0,0,1,2,1,0,0,1,2}, and $k$=expGoOrderYClip[golombOrderIdxYClip[$j$]].

The variable filterClips[sigFiltIdx][j] with sigFiltIdx=0 . . . alf_luma_num_filters_signalled_minus1, j=0 . . . 11 is initialized as follows.
The variable NumYClipValue is set to 4.
For i=0 . . . NumYClipValue−1 alf_luma_clipping_value[$i$]=
Round($2^{(BitDepthY*(NumYClipValue-i)/NumYClipValue)}$),
and filterClips[sigFiltIdx][$j$]=alf_luma_clipping_value [alf_luma_clip_idx[sigFiltIdx][$j$]].

The luma filter clipping values AlfClip$_L$ with elements AlfClip$_L$[filtIdx][j], with filtIdx=0 . . . NumAlfFilters−1 and j=0 . . . 11 are derived as follows:

AlfClip$_L$[filtIdx][$j$]=filterClips[alf_luma_coeff_delta_idx[filtIdx]][$j$].

alf_chroma_chp_min_eg_order_minus1 plus 1 specifies the minimum order of the exp-Golomb code for chroma clipping indexes signalling. The value of alf_chroma_clip_min_eg_order_minus1 shall be in the range of 0 to 6, inclusive.

alf_chroma_chp_eg_order_increase_flag[i] equal to 1 specifies that the minimum order of the exp-Golomb code for chroma clipping indexes signalling is incremented by 1. alf_chroma_clip_eg_order_increase_flag[i] equal to 0 specifies that the minimum order of the exp-Golomb code for chroma clipping indexes signalling is not incremented by 1.

The order expGoOrderC[i] of the exp-Golomb code used to decode the values of alf_chroma_clip_idx[j] is derived as follows:

expGoOrderC[$i$]=alf_chroma_clip_min_eg_order_minus1+1+alf_chroma_clip_eg_order_increase_flag[$i$].

alf_chroma_clip_idx[j] specifies the clipping index of the clipping value to use before multiplying by the j-th coefficient of the chroma filter. When alf_chroma_clip_idx[j] is not present, it is inferred to be equal 0 (no clipping).

The order k of the exp-Golomb binarization uek(v) is derived as follows:

golombOrderIdxC[ ]={0,0,1,0,0,1}, and $k$=expGoOrderC[golombOrderIdxC[$j$]].

The chroma filter clipping values AlfClip$_C$ with elements AlfClip$_C$[j], with j=0 . . . 5 are derived as follows:
The variable NumCClipValue is set to 4;
For i=0 . . . NumCClipValue−1;

alf_chroma_clipping_value[$i$]=
Round($2^{(BitDepthC-8)}$*$2^{(8*(NumCClipValue-i-1)/(NumCClipValue-1))}$);

AlfClip$_C$[$j$]=alf_chroma_clipping_value[alf_chroma_clip_idx[$j$]].

ALF syntax specification according to the VVC specification

ALF Process 1.1 General

Inputs of this process are the reconstructed picture sample arrays prior to ALF recPictureL, recPictureCb and recPictureCr.

Outputs of this process are the modified reconstructed picture sample arrays after ALF alfPictureL, alfPictureCb and alfPictureCr.

The sample values in the modified reconstructed picture sample arrays after ALF alfPictureL, alfPictureCb and alfPictureCr, are initially set equal to the sample values in the reconstructed picture sample arrays prior to ALF recPictureL, recPictureCb and recPictureCr, respectively.

When a value of tile_group_alf_enabled_flag is equal to 1, for every coding tree unit with luma coding tree block location (rx, ry), where rx=0 . . . PicWidthInCtbs−1 and ry=0 . . . PicHeightInCtbs−1, the following process are applied.

When a value of alf_ctb_flag[0][rx][ry] is equal to 1, the coding tree block filtering process for luma samples as specified in clause 1.2 is invoked with recPictureL, alfPictureL, and the luma coding tree block location (xCtb, yCtb) set equal to (rx<<CtbLog2SizeY, ry<<CtbLog2SizeY) as inputs, and the output is the modified filtered picture alfPictureL.

When a value of alf_ctb_flag[1][rx][ry] is equal to 1, the coding tree block filtering process for chroma samples as specified in clause 1.1 is invoked with recPicture set equal to recPictureCb, alfPicture set equal to alfPictureCb, and the chroma coding tree block location (xCtbC, yCtbC) set equal to (rx<<(CtbLog2SizeY−1), ry<<(CtbLog2SizeY−1)) as inputs, and the output is the modified filtered picture alfPictureCb.

When a value of alf_ctb_flag[2][rx][ry] is equal to 1, the coding tree block filtering process for chroma samples as specified in clause 1.4 is invoked with recPicture set equal to recPictureCr, alfPicture set equal to alfPictureCr, and the chroma coding tree block location (xCtbC, yCtbC) set equal to (rx<<(CtbLog2SizeY−1), ry<<(CtbLog2SizeY−1)) as inputs, and the output is the modified filtered picture alfPictureCr.

1.2 Coding Tree Block Filtering Process for Luma Samples

Inputs of this process are:
A reconstructed luma picture sample array recPictureL prior to the adaptive loop filtering process;
A filtered reconstructed luma picture sample array alfPictureL; and
A luma location (xCtb, yCtb) specifying the top-left sample of the current luma coding tree block relative to the top left sample of the current picture.

Output of this process is the modified filtered reconstructed luma picture sample array alfPictureL.

The derivation process for filter index clause 1.3 is invoked with the location (xCtb, yCtb) and the reconstructed luma picture sample array recPictureL as inputs, and filtIdx[x][y] and transposeIdx[x][y] with x, y=0 . . . CtbSizeY−1 as outputs.

For the derivation of the filtered reconstructed luma samples alfPictureL[x][y], each reconstructed luma sample inside the current luma coding tree block recPictureL[x][y] is filtered as follows with x, y=0 . . . CtbSizeY−1:

The array of luma filter coefficients f[j] corresponding to the filter specified by filtIdx[x][y] is derived as follows with j=0 . . . 12:

$f[j] = \text{AlfCoeff}_L[\text{filtIdx}[x][y]][j].$

The array of luma filter clipping values c[j] corresponding to the filter specified by filtIdx[x][y] is derived as follows with j=0 . . . 11:

$c[j] = \text{AlfClip}_L[\text{filtIdx}[x][y]][j].$

The luma filter coefficients filterCoeff are derived depending on transposeIdx[x][y] as follows:
If transposeIndex[x][y]==1, filterCoeff[ ]={f[9],f[4],f[10],f[8],f[1],f[5],1,f[7],f[3],f[0],f[2],f[6],f[12]} filterClip[ ]={c[9],c[4],c[10],c[8],c[1],c[5],c[11],c[7],c[3],c[0],c[2],c[6]}

Otherwise, if transposeIndex[x][y]==2, filterCoeff[ ]={f[0],f[3],f[2],f[1],f[8],f[7],f[6],f[5],f[4],f[9],f[10],f[11],f[12]} filterClip[ ]={c[0],c[3],c[2],c[1],c[8],c[7],c[6],c[5],c[4],c[9],c[10],c[11]}

Otherwise, if transposeIndex[x][y]==3, filterCoeff[ ]={f[9],f[8],f[10],f[4],f[3],f[7],f[11],f[5],f[1],f[0],f[2],f[6],f[12]} filterClip[ ]={c[9],c[8],c[10],c[4],c[3],c[7],c[11],c[5],c[1],c[0],c[2],c[6]}

Otherwise, filterCoeff[ ]={f[0],f[1],f[2],f[3],f[4],f[5],f[6],f[7],f[8],f[9],f[10],f[11],f[12]} filterClip[ ]={c[0],c[1],c[2],c[3],c[4],c[5],c[6],c[7],c[8],c[9],c[10],c[11]}

The locations (hx, vy) for each of the corresponding luma samples (x,y) inside the given array recPicture of luma samples are derived as follows:

$hx = \text{Clip3}(0, \text{pic\_width\_in\_luma\_samples} - 1, xCtb + x),$
and $vy = \text{Clip3}(0, \text{pic\_height\_in\_luma\_samples} - 1, yCtb + y).$ The variable sum is derived as follows:

sum=filterCoeff[0]*(Clip3(−filterClip[0],filterClip[0], recPicture$_L$[h$_x$,v$_{y+3}$]−curr)+Clip3(−filterClip[0], filterClip[0],recPicture$_L$[h$_{x-1}$,v$_{y-3}$]−curr))+filter-Coeff[1]*(Clip3(−filterClip[1],filterClip[1], recPicture$_L$[h$_{x+1}$,v$_{y+2}$]−curr)+Clip3(−filterClip[1],filterClip[1],recPicture$_L$[h$_{x-1}$,v$_{y-2}$]−curr))+filterCoeff[2]*(Clip3(−filterClip[2],filterClip[2], recPicture$_L$[h$_x$,v$_{y+2}$]−curr)+Clip3(−filterClip[2],filterClip[2],recPicture$_L$[h$_x$,v$_{y-2}$]−curr))+filterCoeff[3]*(Clip3(−filterClip[3],filterClip[3], recPicture$_L$[h$_{x-1}$,v$_{y+2}$]−curr)+Clip3(−filterClip[3],filterClip[3],recPicture$_L$[h$_{x+1}$,v$_{y-2}$]−curr))+filterCoeff[4]*(Clip3(−filterClip[4],filterClip[4], recPicture$_L$[h$_{x-2}$,v$_{y+1}$]−curr)+Clip3(−filterClip[4],filterClip[4],recPicture$_L$[h$_{x-2}$,v$_{y-1}$]−curr))+filterCoeff[5]*(Clip3(−filterClip[5],filterClip[5], recPicture$_L$[h$_{x+1}$,v$_{y+1}$]−curr)+Clip3(−filterClip[5],filterClip[5],recPicture$_L$[h$_{x-1}$,v$_{y-1}$]−curr))+filterCoeff[6]*(Clip3(−filterClip[6],filterClip[6], recPicture$_L$[h$_x$,v$_{y+1}$]−curr)+Clip3(−filterClip[6],filterClip[6],recPicture$_L$[h$_x$,v$_{y-1}$]−curr))+filterCoeff[7]*(Clip3(−filterClip[7],filterClip[7], recPicture$_L$[h$_{x-1}$,v$_{y+1}$]−curr)+Clip3(−filterClip[7],filterClip[7],recPicture$_L$[h$_{x+1}$,v$_{y-1}$]−curr))+filterCoeff[8]*(Clip3(−filterClip[8],filterClip[8], recPicture$_L$[h$_{x-2}$,v$_{y+1}$]−curr)+Clip3(−filterClip[8],filterClip[8],recPicture$_L$[h$_{x+2}$,v$_{y-1}$]−curr))+filterCoeff[9]*(Clip3(−filterClip[9],filterClip[9], recPicture$_L$[h$_{x+3}$,v$_y$]−curr)+Clip3(−filterClip[9],filterClip[9],recPicture$_L$[h$_{x-3}$,v$_y$]−curr))+filterCoeff[10]*(Clip3(−filterClip[10],filterClip[10],recPicture$_L$[h$_{x+2}$,v$_y$]−curr)+Clip3(−filterClip[10],filterClip[10],recPicture$_L$[h$_{x-2}$,v$_y$]−curr))+filterCoeff[11]*(Clip3(−filterClip[11],filterClip[11],recPicture$_L$[h$_{x+1}$,v$_y$]−curr)+Clip3(−filterClip[11],filterClip[11],recPicture$_L$[h$_{x-1}$,v$_y$]−curr))

sum=curr+((sum+64)>>7).

The modified filtered reconstructed luma picture sample alfPictureL[xCtb+x][yCtb+y] is derived as follows:

alfPictureL[xCtb+x][yCtb]+y=Clip3(0,(1<<BitDepthY)−1,sum).

1.3 Derivation Process for ALF Transpose and Filter Index for Luma Sample

Inputs of this process are a luma location (xCtb, yCtb) specifying the top-left sample of the current luma coding tree block relative to the top left sample of the current picture, a reconstructed luma picture sample array recPicture$_L$ prior to the adaptive loop filtering process.

Outputs of this process are the classification filter index array filtIdx[x][y] with x, y=0 . . . CtbSizeY−1, the transpose index array transposeIdx[x][y] with x, y=0 . . . CtbSizeY−1.

The locations (hx, vy) for each of the corresponding luma samples (x,y) inside the given array recPicture of luma samples are derived as follows:

hx=Clip3(0,pic_width_in_luma_samples−1,x), and vy=Clip3(0,pic_height_in_luma_samples−1,y).

The classification filter index array filtIdx and the transpose index array transposeIdx are derived by the following ordered steps.

The variables filtH[x][y], filtV[x][y], filtD0[x][y] and filtD1[x][y] with x, y=−2 . . . CtbSizeY+1 are derived as follows.

If both x and y are even numbers or both x and y are uneven numbers, the following applies:

filtH[x][y]=Abs((recPicture[hxCtb+x,vyCtb+y]<<1)−recPicture[hxCtb+x−1,vyCtb+y]−recPicture[hxCtb+x+1,vyCtb+y])

filtV[x][y]=Abs((recPicture[hxCtb+x,vyCtb+y]<<1)−recPicture[hxCtb+x,vyCtb+y−1]−recPicture[hxCtb+x,vyCtb+y+1])

filtD0[x][y]=Abs((recPicture[hxCtb+x,vyCtb+y]<<1)−recPicture[hxCtb+x−1,vyCtb+y−1] −recPicture[hxCtb+x+1,vyCtb+y+1])

filtD1[x][y]=Abs((recPicture[hxCtb+x,vyCtb+y]<<1)−recPicture[hxCtb+x+1,vyCtb+y−1] −recPicture[hxCtb+x−1,vyCtb+y+1])

Otherwise, filtH[x][y], filtV[x][y], filtD0[x][y] and filtD1[x][y] are set equal to 0.

The variables varTempH1[x][y], varTempV1[x][y], varTempD01[x][y], varTempD11[x][y] and varTemp[x][y] with x, y=0 . . . (CtbSizeY−1)>>2 are derived as follows:

sumH[x][y]=Σ$_i$Σ$_j$ filtH[(x<<2)+i][(y<<2)+j] with i,j=−2 . . . 5 sumV[x][y]=Σ$_i$Σ$_j$ filtV[(x<<2)+i][(y<<2)+j] with i,j=−2 . . . 5 sumD0[x][y]=Σ$_i$Σ$_j$ filtD0[(x<<2)+i][(y<<2)+j] with i,j=−2 . . . 5 sumD1[x][y]=Σ$_i$Σ$_j$ filtD1[(x<<2)+i][(y<<2)+j] with i,j=−2 . . . 5 sumOfHV[x][y]=sumH[x][y]+sumV[x][y]

The variables dir1[x][y], dir2[x][y] and dirS[x][y] with x, y=0 . . . CtbSizeY−1 are derived as follows.

The variables hv1, hv0 and dirHV are derived as follows. If sumV[x>>2][y>>2] is greater than sumH[x>>2] [y>>2], the following applies:

hv1=sumV[x>>2][y>>2]

hv0=sumH[x>>2][y>>2]

dirHV=1.

Otherwise, the following applies:

hv1=sumH[x>>2][y>>2]

hv0=sumV[x>>2][y>>2]

dirHV=3.

The variables d1, d0 and dirD are derived as follows:
If sumD0[x>>2][y>>2] is greater than sumD1[x>>2] [y>>2], the following applies:

d1=sumD0[x>>2][y>>2]

d0=sumD1[x>>2][y>>2]

dirD=0.

Otherwise, the following applies:

d1=sumD1[x>>2][y>>2]

d0=sumD0[x>>2][y>>2]

dirD=2.

The variables hvd1, hvd0, are derived as follows:

hvd1=(d1*hv0>hv1*d0)?d1:hv1 hvd0=(d1*hv0>hv1*d0)?d0:hv0.

The variables dirS[x][y], dir1[x][y] and dir2[x][y] derived as follows:

dir1[x][y]=(d1*hv0>hv1*d0)?dirD:dirHV dir2[x][y]=(d1*hv0>hv1*d0)?dirHV:dirD dirS[x][y]=(hvd1>2*hvd0)?1:((hvd1*2>9*hvd0)?2:0).

The variable avgVar[x][y] with x, y=0 . . . CtbSizeY−1 is derived as follows:

varTab[ ]={0,1,2,2,2,2,2,3,3,3,3,3,3,3,3,4} avgVar[x][y]=varTab[Clip3(0,15,(sumOfHV[x>>2] [y>>2]*64)>>(3+BitDepthY))].

The classification filter index array filtIdx[x][y] and the transpose index array transposeIdx[x][y] with x=y=0 . . . CtbSizeY−1 are derived as follows:

transposeTable[ ]=0,1,0,2,2,3,1,3 transposeIdx[x][y]=transposeTable[dir1[x][y]*2+(dir2 [x][y]>>1)]

filtIdx[x][y]=avgVar[x][y].

When dirS[x][y] is not equal 0, filtIdx[x][y] is modified as follows:

filtIdx[x][y]+=(((dir1[x][y]&0x1)<<1)+dirS[x][y])*5.

1.4 Coding Tree Block Filtering Process for Chroma Samples

Inputs of this process are a reconstructed chroma picture sample array recPicture prior to the adaptive loop filtering process, a filtered reconstructed chroma picture sample array alfPicture, a chroma location (xCtbC, yCtbC) specifying the top-left sample of the current chroma coding tree block relative to the top left sample of the current picture.

Output of this process is the modified filtered reconstructed chroma picture sample array alfPicture.

The size of the current chroma coding tree block ctbSizeC is derived as follows:

ctbSize$C$=CtbSize$Y$/SubWidth$C$

For the derivation of the filtered reconstructed chroma samples alfPicture[x][y], each reconstructed chroma sample inside the current chroma coding tree block:

recPicture[x][y] is filtered as follows with $x,y$=0 . . . ctbSize$C$−1.

The locations (hx, vy) for each of the corresponding chroma samples (x,y) inside the given array recPicture of chroma samples are derived as follows:

$hx$=Clip3(0,pic_width_in_luma_samples/SubWidth$C$−1,$xCtbC$+$x$)

$vy$=Clip3(0,pic_height_in_luma_samples/SubHeight$C$−1,$yCtbC$+$y$).

The variable sum is derived as follows:

sum=AlfCoeff$_C$[0]*(Clip3(−AlfClip$_C$[0],AlfClip$_C$[0], recPicture[$h_x,v_{y+2}$]−curr)+Clip3(−AlfClip$_C$[0], AlfClip$_C$[0],recPicture[$h_x,v_{y-2}$]−curr))+AlfCoeff$_C$[1]*(Clip3(−AlfClip$_C$[1],AlfClip$_C$[1], recPicture[$h_{x-1},v_{y-1}$]−curr)+Clip3(−AlfClip$_C$[1], AlfClip$_C$[1],recPicture[$h_{x-x-1},v_{y-1}$]−curr))+ AlfCoeff$_C$[2]*(Clip3(−AlfClip$_C$[2],AlfClip$_C$[2], recPicture[$h_x,v_{y+1}$]−curr)+Clip3(−AlfClip$_C$[2], AlfClip$_C$[2],recPicture[$h_x,v_{y-1}$]−curr))+ AlfCoeff$_C$[3]*(Clip3(−AlfClip$_C$[3],AlfClip$_C$[3], recPicture[$h_{x-1},v_{y+1}$]−curr)+Clip3(−AlfClip$_C$[3], AlfClip$_C$[3],recPicture[$h_{x+1},v_{y-1}$]−curr)+ AlfCoeff$_C$[4]*(Clip3(−alfClip$_C$[4],alfClip$_C$[4], recPicture[$h_{x-2},v_y$]−curr)+Clip3(−AlfClip$_C$[4], AlfClip$_C$[4],recPicture[$h_{x-2},v_y$]−curr)+AlfCoeff$_C$[5]*(Clip3(−AlfClip$_C$[5],AlfClip$_C$[5],recPicture[$h_{x+1},v_y$]−curr)+Clip3(−AlfClip$_C$[5],AlfClip$_C$[5], recPicture[$h_{x-1},v_y$]−curr))

sum=curr+((sum+64)>>7).

The modified filtered reconstructed chroma picture sample alfPicture[xCtbC+x][yCtbC+y] is derived as follows:

alfPicture[$xCtbC$+$x$][$yCtbC$+$y$]=Clip3(0,(1<<BitDepth$C$)−1,sum).

As described above and as shown in FIG. 8, the ALF Luma and Chroma clipping parameters are transmitted using Kth order exponential-Golomb codes similar to the ALF filter coefficients.

The usage of Kth order exponential-Golomb codes for the clipping parameters may not be efficient in terms of coding efficiency, as the clipping parameter signaled is just an index into the table of clipping values (see Table 2 above). The value of the index ranges from 0 till 3.

Therefore signaling index values 0 till 3 using Kth order exponential-Golomb codes in the same way as the ALF filter coefficients uses the additional syntax elements, alf_luma_clip_min_eg_order_minus1, alf_luma_clip_eg_order_increase_flag[i] to determine the value K (order of the exponential-Golomb code to be used) and then the syntax element alf_luma_clip_idx is signaled using the Kth order exponential-Golomb code. Therefore, this method of signaling is complex and also not efficient in terms of coding efficiency. Therefore, a simpler method of signaling the clipping parameters is desired.

In one embodiment of the proposed solution (solution 1), as shown in FIG. 9, the clipping parameters are signaled used fixed length codes and therefore the syntax elements alf_luma_clip_min_eg_order_minus1, alf_luma_clip_eg_order_increase_flag[i] are not used. The syntax element alf_luma_clip_idx is signaled using a fixed length code of 2 bits. This method has the advantage that the clipping parameters are signaled in a very simple way, the coding efficiency is improved as few of the syntax elements related to Kth order exponential-Golomb codes are not signaled any more.

The modified alf_data syntax is as follows:

|  | Descriptor |
|---|---|
| alf_data( ) { |  |
|   alf_chroma_idc | tu(v) |
|   alf_luma_clip | u(1) |
|   if( alf_choma_idc ) |  |
|     alf_chroma_clip | u(1) |
|   alf_luma_num_filters_signalled_minus1 | tb(v) |
|   if( alf_luma_num_filters_signalled_minus1 > 0 ) { |  |
|     for( filtIdx = 0; filtIdx < NumAlfFilters; filtIdx++ ) |  |
|       alf_luma_coeff_delta_idx[ filtIdx ] | tb(v) |
|   } |  |
|   alf_luma_coeff_delta_flag | u(1) |
|   if ( !alf_luma_coeff_delta_flag && |  |
| alf_luma_num_filters_signalled_minus1 > 0 ) |  |
|     alf_luma_coeff_delta_prediction_flag | u(1) |
|   alf_luma_min_eg_order_minus1 | ue(v) |
|   for(i=0; i < 3; i++ ) |  |
|     alf_luma_eg_order_increase_flag[ i ] | u(1) |
|   if ( alf_luma_coeff_delta_flag ) { |  |
|     for( sigFiltIdx = 0; sigFiltIdx <= alf_luma_num_filters_signalled_minus1; sigFiltIdx++ ) |  |
|       alf_luma_coeff_flag[ sigFiltIdx ] | u(1) |
|   } |  |
|   for( sigFiltIdx = 0; sigFiltIdx <= alf_luma_num_filters_signalled_minus1; sigFiltIdx++ ) { |  |
|     if ( alf_luma_coeff_flag[ sigFiltIdx ] ) { |  |
|       for ( j = 0; j < 12; j++ ) { |  |
|         alf_luma_coeff_delta_abs[ sigFiltIdx ][ j ] | uek(v) |
|         if( alf_luma_coeff_delta_abs[ sigFiltIdx ][ j ] ) |  |
|           alf_luma_coeff_delta_sign[ sigFiltIdx ][ j ] | u(1) |
|       } |  |
|     } |  |
|     if( alf_luma_clip ) { |  |
|       for ( sigFiltIdx = 0; sigFiltIdx <= alf_luma_num_filters_signalled_minus1; sigFiltIdx++ ) { |  |
|         if ( alf_luma_coeff_flag[ sigFiltIdx ] ) { |  |
|           for ( j = 0; j < 12; j++ ) { |  |
|             if( filterCoefficients[ sigFiltIdx ][ j ] ) |  |
|               alf_luma_clip_idx[ sigFiltIdx ][ j ] | u(2) |
|           } |  |
|         } |  |
|       } |  |
|     } |  |
|   } |  |
|   if ( alf_chroma_idc > 0 ) { |  |
|     for(i=0;i< 2; i++ ) |  |
|       for( j = 0; j < 6; j++ ) { |  |
|         alf_chroma_coeff_abs[ j ] | uek(v) |
|         if( alf_chroma_coeff_abs[ j ] > 0) |  |
|           alf_chroma_coeff_sign[ j ] | u(1) |
|       } |  |
|   } |  |
|   if ( alf_chroma_idc > 0 && alf_chroma_clip ) { |  |
|     for( j = 0; j < 6; j++ ) { |  |
|       if( alf_chroma_coeff_abs[ j ]) |  |
|         alf_chroma_clip_idx[ j ] | u(2) |
|     } |  |
|   } |  |
| } |  |

As an embodiment of an alternative solution (solution 2), truncated unary coding may also be used to signal the clipping parameter index.

As an embodiment of an alternative solution (solution 3), if the number of clipping parameters is changed from a fixed value of 4 to a different number greater than 4, the fixed length code (v) "value v" is correspondingly increased. E.g. if the number of clipping parameters is increased from 4 to 5 or 6, then the fixed length code uses 3 bits to signal the clipping parameter.

As an embodiment of an alternative solution (solution 4), ALF filter coefficients are signaled using fixed length code instead of the Kth order exponential-Golomb code.

Figure 10:
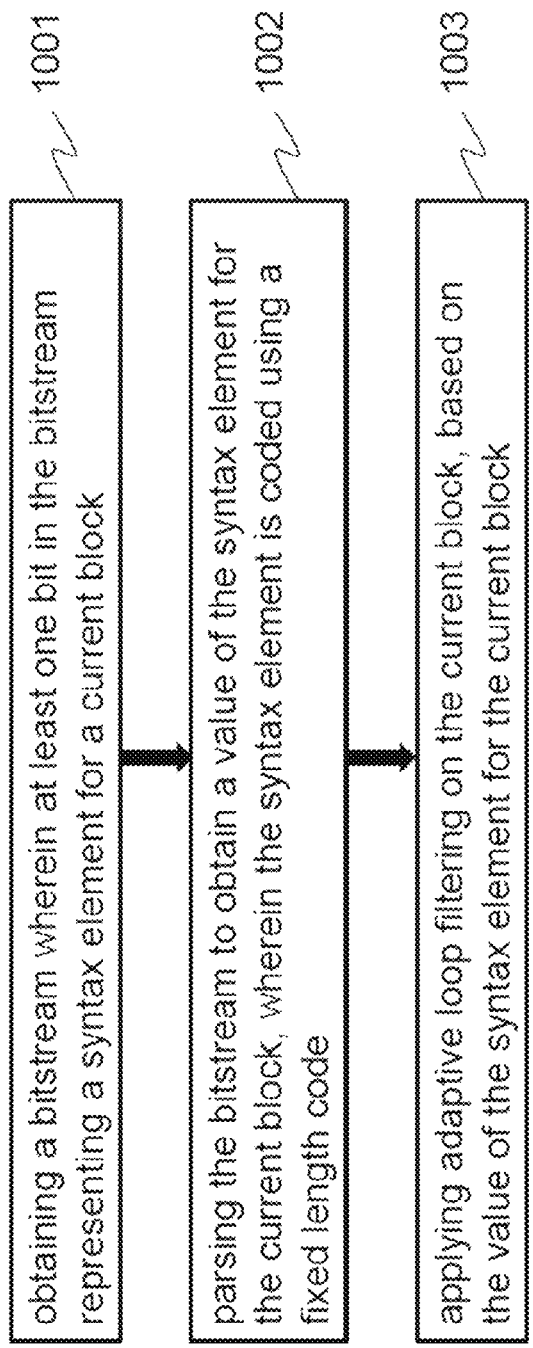
FIG. 10 is a block diagram illustrating the method according to the first aspect of the present disclosure.

FIG. 10 is a block diagram illustrating the method according to the first aspect of the present disclosure. The method comprises the steps obtaining a bitstream wherein at least one bit in the bitstream representing a syntax element for a current block, 1001, wherein the syntax element is an ALF clipping value index specifying the clipping index of the clipping value to use before multiplying by the coefficient of the ALF, parsing the bitstream to obtain a value of the syntax element for the current block, wherein the syntax element is coded using a fixed length code, 1002, applying adaptive loop filtering on the current block, based on the value of the syntax element for the current block, 1003.

Figure 11:
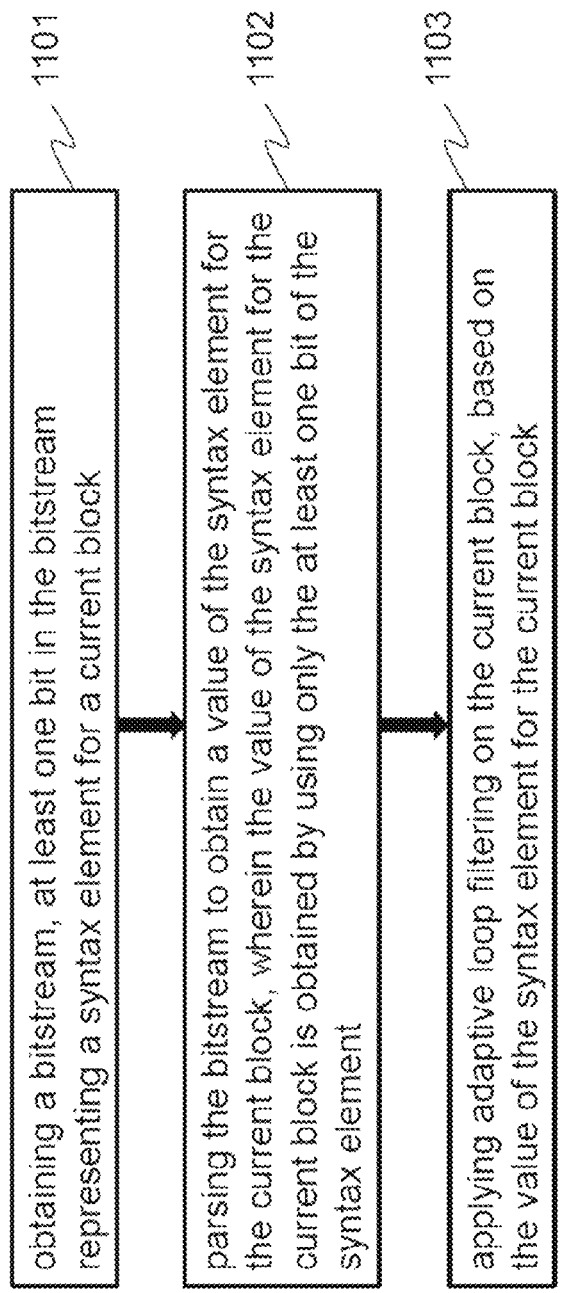
FIG. 11 is a block diagram illustrating the method according to the second aspect of the present disclosure.

FIG. 11 is a block diagram illustrating the method according to the second aspect of the present disclosure. According to a second aspect, there is provided a method of coding, implemented by a decoding device, the method comprising the step of obtaining a bitstream, at least one bit in the bitstream representing a syntax element for a current block, 1101, wherein the syntax element is an ALF clipping value index or an ALF coefficient parameter, parsing the bitstream to obtain a value of the syntax element for the current block, wherein the value of the syntax element for the current block is obtained by using only the at least one bit of the syntax element, 1102, applying adaptive loop filtering on the current block, based on the value of the syntax element for the current block, 1103.

Figure 12:
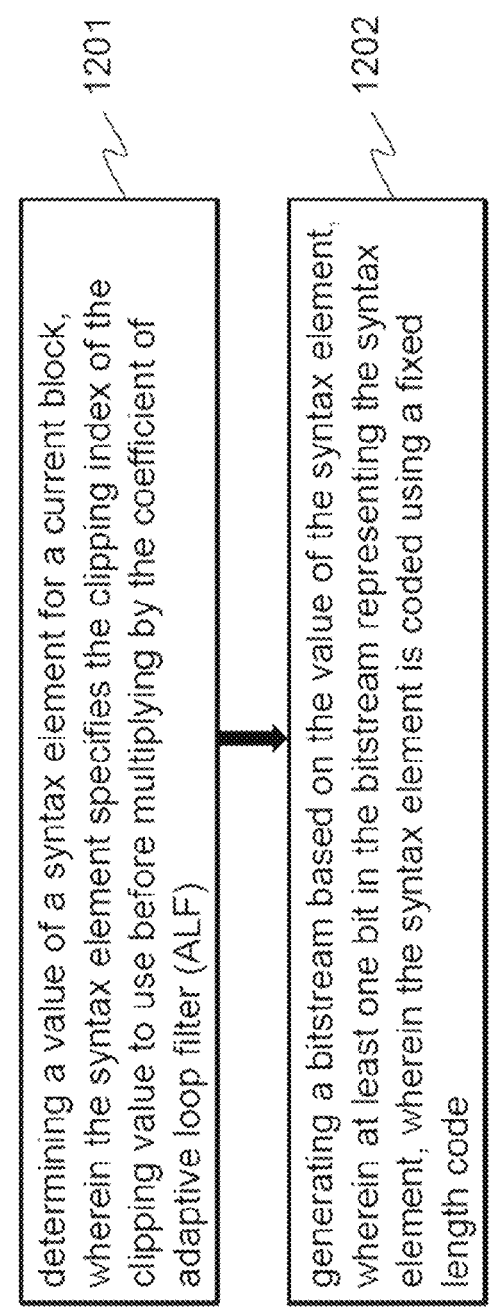
FIG. 12 is a block diagram illustrating the method according to the third aspect of the present disclosure.

FIG. 12 is a block diagram illustrating the method according to the third aspect of the present disclosure. According to a third aspect, there is provided a method of coding, implemented by an encoding device, the method comprising determining a value of a syntax element for a current block, wherein the syntax element specifies the clipping index of the clipping value to use before multiplying by the coefficient of ALF 1201, generating a bitstream based on the value of the syntax element, wherein at least one bit in the bitstream representing the syntax element, wherein the syntax element is coded using a fixed length code, 1202.

Figure 13:
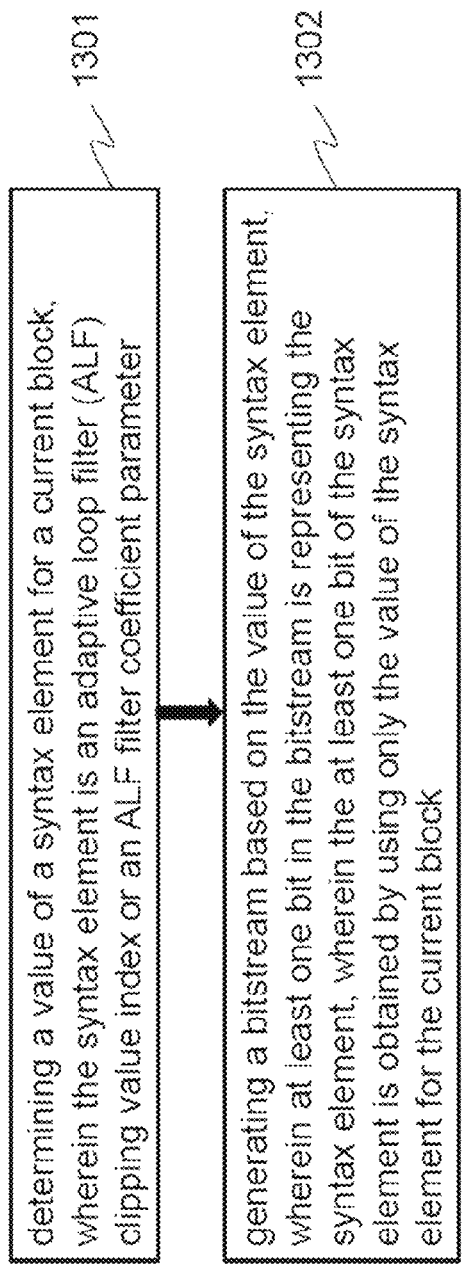
FIG. 13 is a block diagram illustrating the method according to the fourth aspect of the present disclosure.

FIG. 13 is a block diagram illustrating the method according to the fourth aspect of the present disclosure. According to the fourth aspect, there is provided a method of coding, implemented by an encoding device, the method comprising determining a value of a syntax element for a current block, wherein the syntax element is an ALF clipping value index or an ALF filter coefficient parameter, 1301, generating a bitstream based on the value of the syntax element, wherein at least one bit in the bitstream representing the syntax element, wherein the at least one bit of the syntax element is obtained by using only the value of the syntax element for the current block, 1302.

Figure 14:
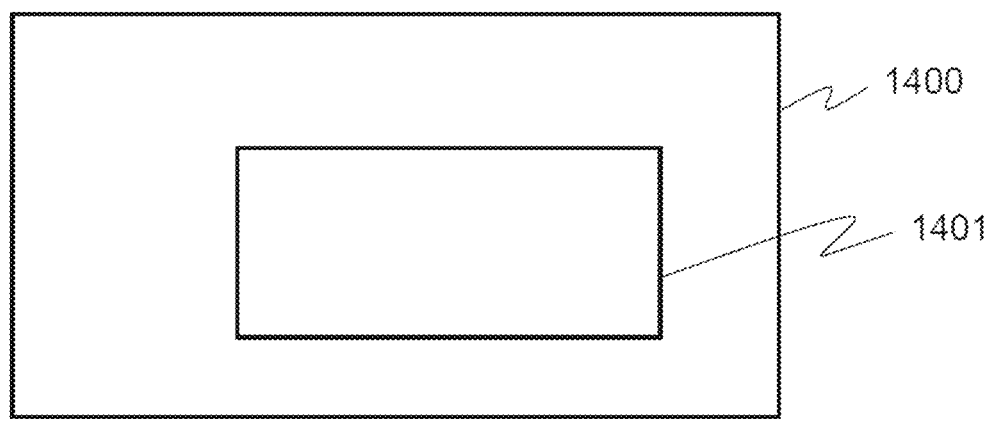
FIG. 14 is a block diagram illustrating a decoder according to the fifth aspect of the present disclosure.

FIG. 14 is a block diagram illustrating a decoder according to the fifth aspect of the present disclosure. According to a fifth aspect of the present disclosure there is provided a decoder 1400 comprising processing circuitry 1401 for carrying out the method according to the first or second aspect or any implementation thereof.

Figure 15:
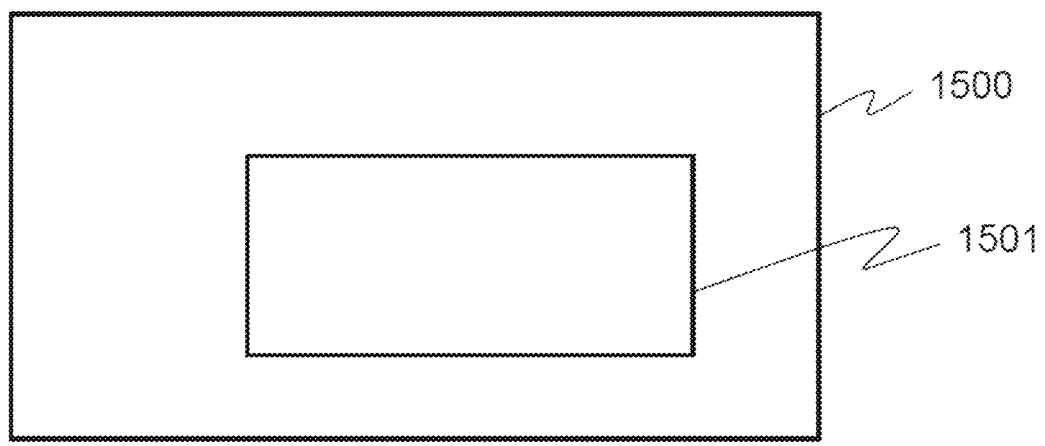
FIG. 15 is a block diagram illustrating an encoder according to the sixth aspect of the present disclosure.

FIG. 15 is a block diagram illustrating an encoder according to the sixth aspect of the present disclosure. According to a sixth aspect of the present disclosure there is provided an encoder 1500 comprising processing circuitry 1501 for carrying out the method according to the third or fourth aspect or any implementation thereof.

Figure 16:
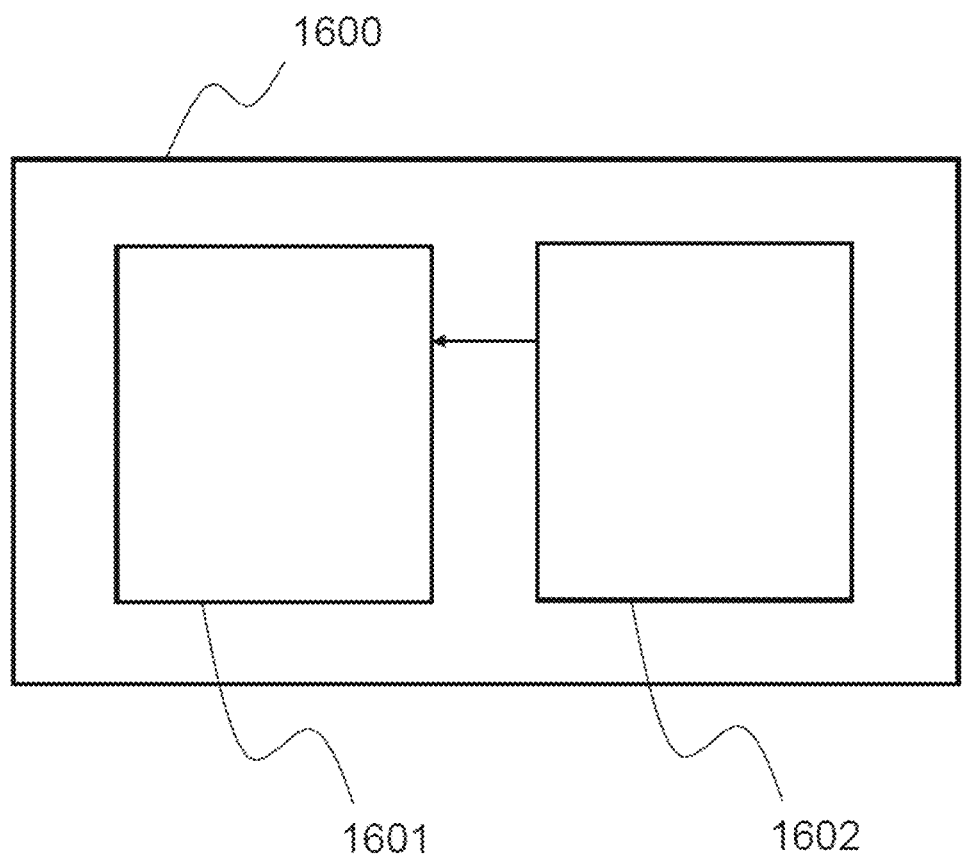
FIG. 16 is a block diagram illustrating a decoder according to the ninth aspect of the present disclosure.

FIG. 16 is a block diagram illustrating a decoder according to the ninth aspect of the present disclosure. According to a ninth aspect of the present disclosure there is provided a decoder 1600, comprising one or more processors 1601, and a non-transitory computer-readable storage medium 1602 coupled to the processors 1601 and storing programming for execution by the processors 1601, wherein the programming, when executed by the processors 1601, configures the decoder 1600 to carry out the method according to the first or second aspect or any implementation thereof.

Figure 17:
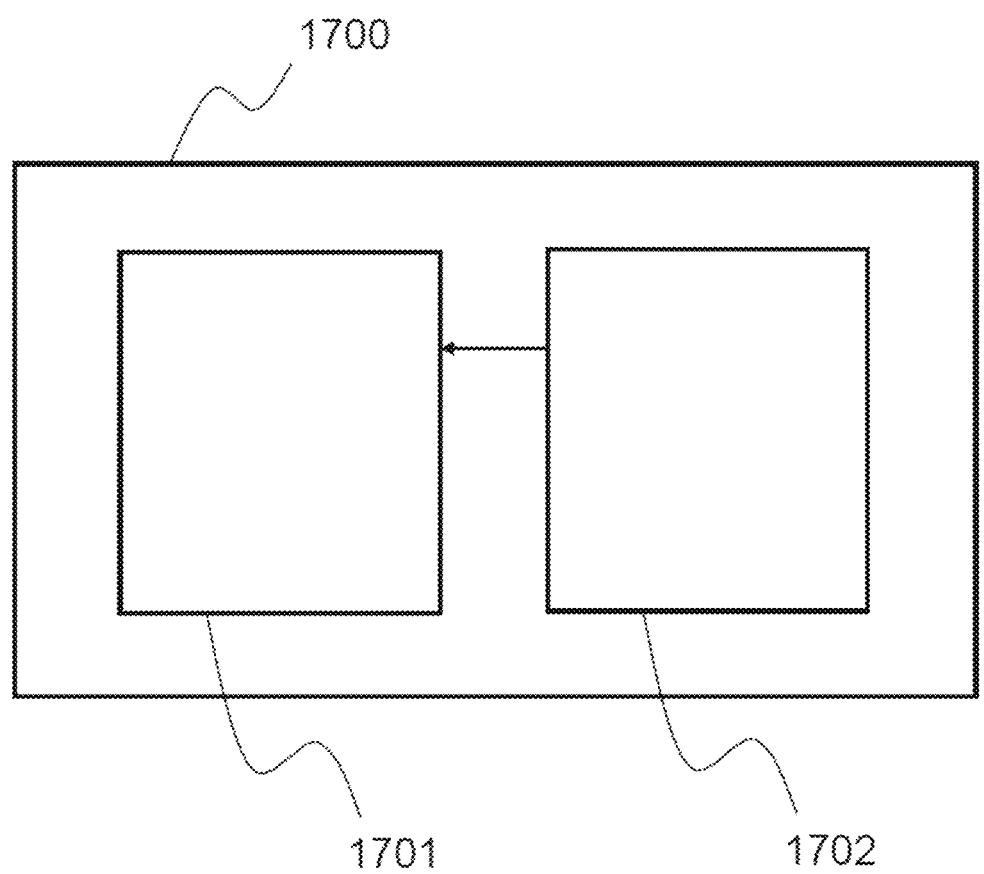
FIG. 17 is a block diagram illustrating an encoder according to the tenth aspect of the present disclosure.

FIG. 17 is a block diagram illustrating an encoder according to the tenth aspect of the present disclosure. According to a tenth aspect of the present disclosure there is provided an encoder 1700, comprising one or more processors 1701, and a non-transitory computer-readable storage medium 1702 coupled to the processors 1701 and storing programming for execution by the processors 1701, wherein the programming, when executed by the processors 1701, configures the encoder 1700 to carry out the method according to the third or fourth aspect or any implementation thereof.

Figure 18:
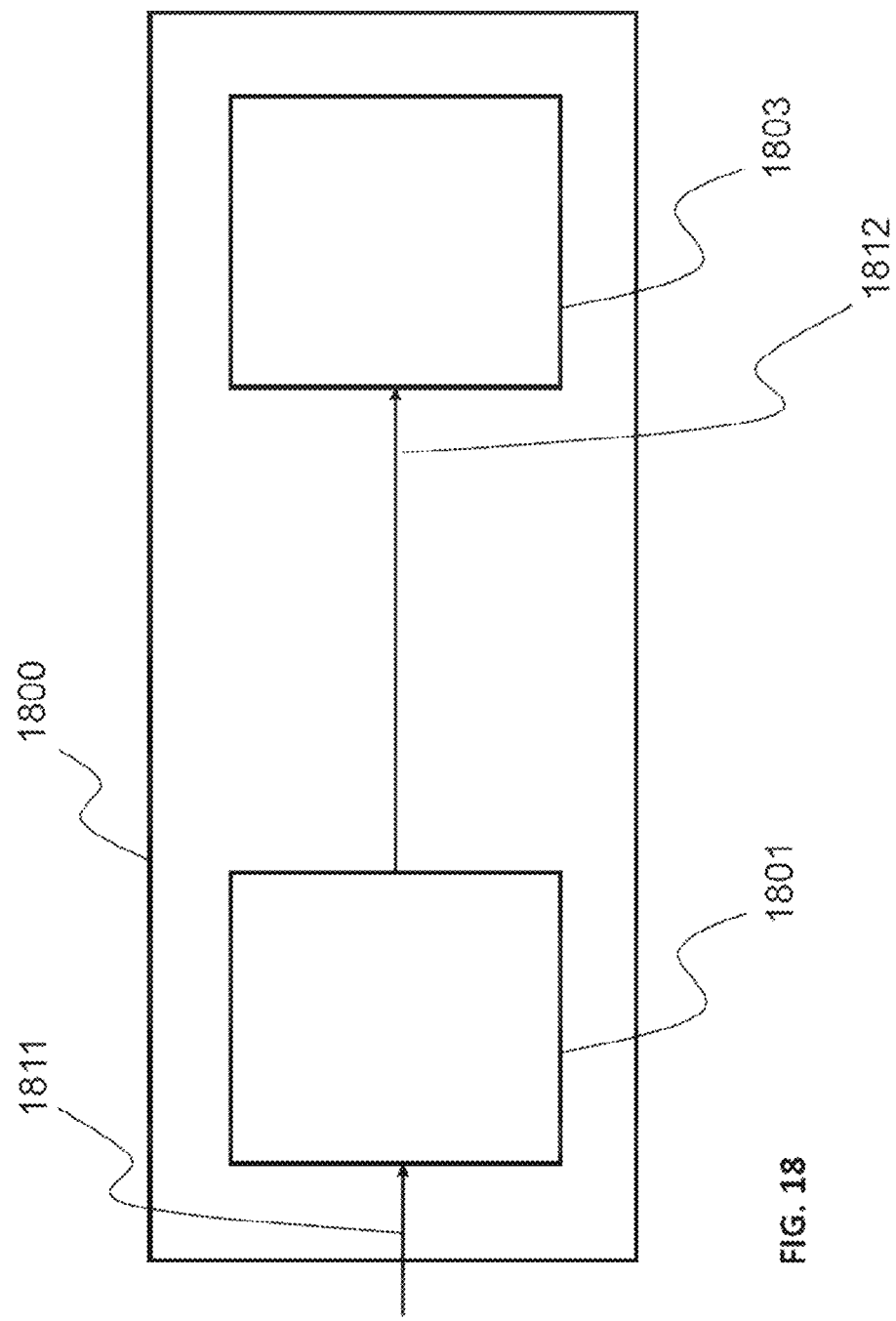
FIG. 18 is a block diagram illustrating a decoder according to the eleventh aspect of the present disclosure.

FIG. 18 is a block diagram illustrating a decoder according to the eleventh aspect of the present disclosure. According to an eleventh aspect of the present disclosure there is provided a decoder 1800, comprising an entropy decoding unit 1801 (may be entropy decoding unit 304), configured to obtain a bitstream 1811 wherein at least one bit in the bitstream 1811 representing a syntax element for a current block, wherein the syntax element is an ALF clipping value index specifying the clipping index of the clipping value to use before multiplying by the coefficient of ALF, the entropy decoding unit 1801, is further configured to parse the bitstream 1811 to obtain a value 1812 of the syntax element for the current block, wherein the syntax element is coded using a fixed length code, and a filtering unit 1803 (may be loop filter 320), configured to apply adaptive loop filtering on the current block, based on the value 1812 of the syntax element for the current block.

Figure 19:
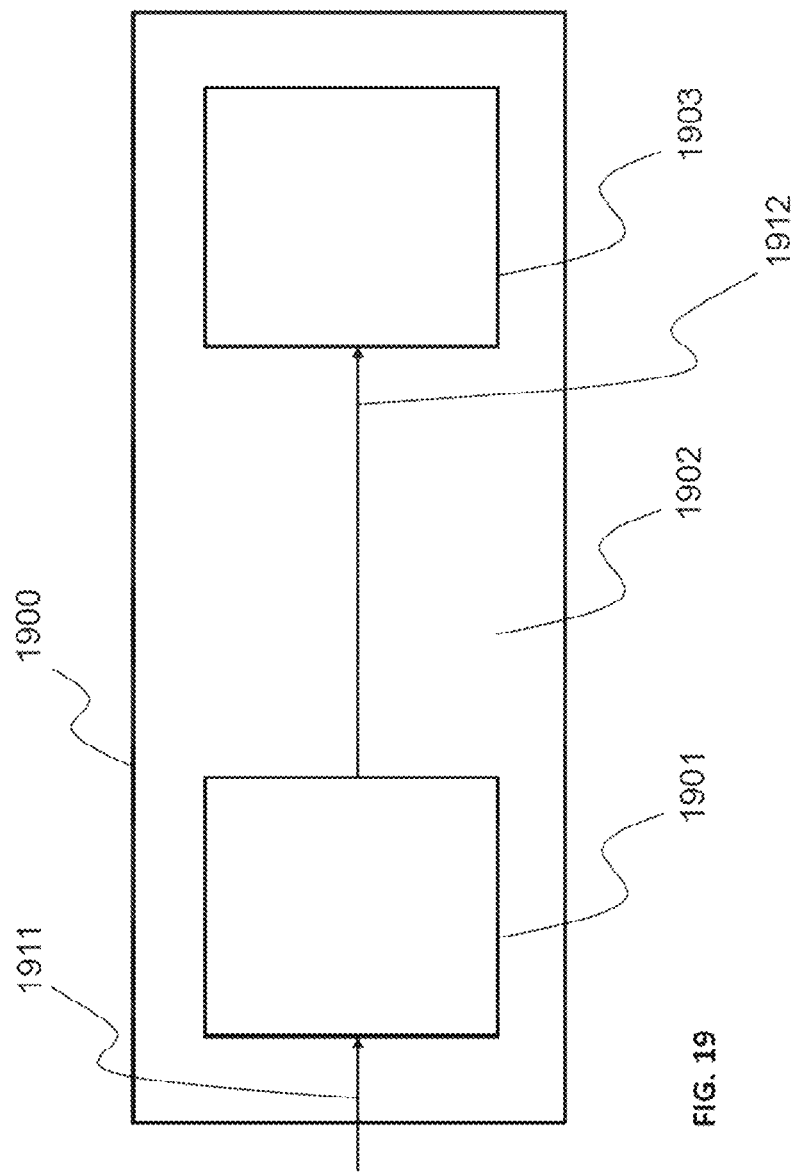
FIG. 19 is a block diagram illustrating a decoder according to the twelfth aspect of the present disclosure.

FIG. 19 is a block diagram illustrating a decoder according to the twelfth aspect of the present disclosure. According to a twelfth aspect of the present disclosure there is provided a decoder 1900, comprising an entropy decoding unit 1901 (may be entropy decoding unit 304), configured to obtain a bitstream 1911, at least one bit in the bitstream 1911 representing a syntax element for a current block, wherein the syntax element is an ALF clipping value index or an ALF coefficient parameter, the entropy decoding unit 1801, is further configured to parse the bitstream to obtain a value 1912 of the syntax element for the current block, wherein the value of the syntax element for the current block is obtained by using only the at least one bit of the syntax element, and a filtering unit 1903 (may be loop filter 320), configured to apply adaptive loop filtering on the current block, based on the value 1912 of the syntax element for the current block.

Figure 20:
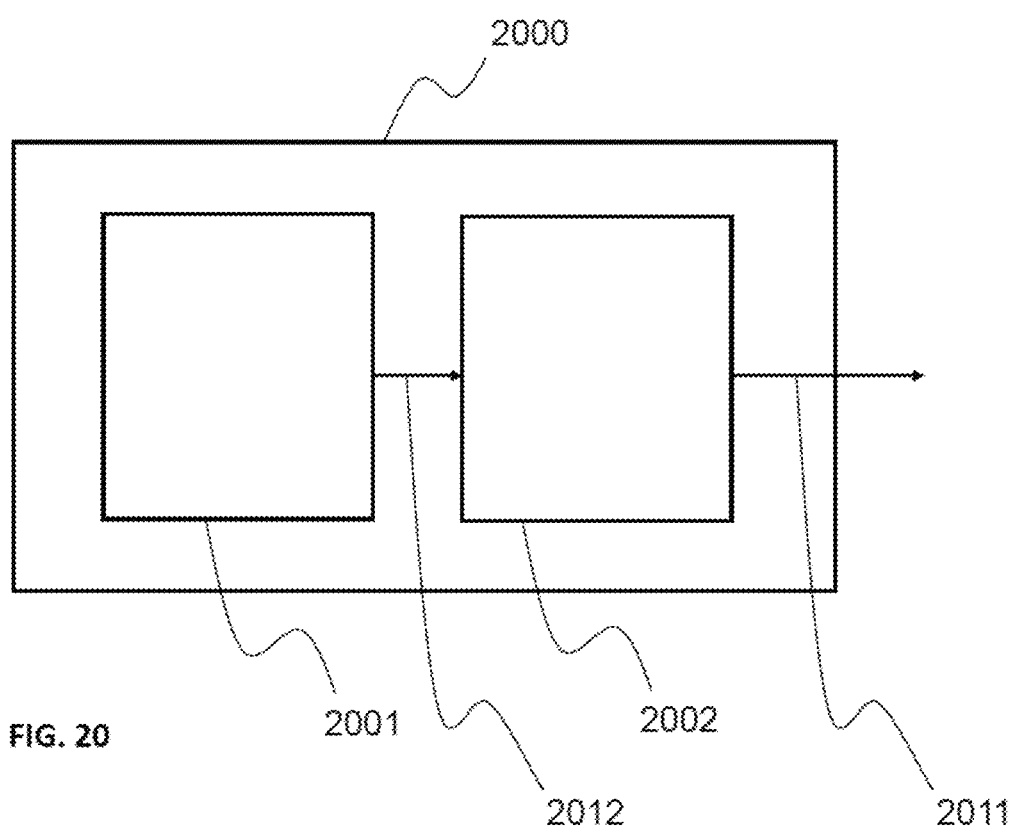
FIG. 20 is a block diagram illustrating an encoder according to the thirteenth aspect of the present disclosure.

FIG. 20 is a block diagram illustrating an encoder according to the thirteenth aspect of the present disclosure. According to a thirteenth aspect of the present disclosure there is provided an encoder 2000, comprising a determining unit 2001 (may be loop filter 220), configured to determining a value 2012 of a syntax element for a current block, wherein the syntax element specifies the clipping index of the clipping value to use before multiplying by the coefficient of ALF, an entropy encoding unit 2002 (may be entropy encoding unit 270), configured to generate a bitstream 2011 based on the value 2012 of the syntax element, wherein at least one bit in the bitstream 2011 representing the syntax element, wherein the syntax element is coded using a fixed length code.

Figure 21:
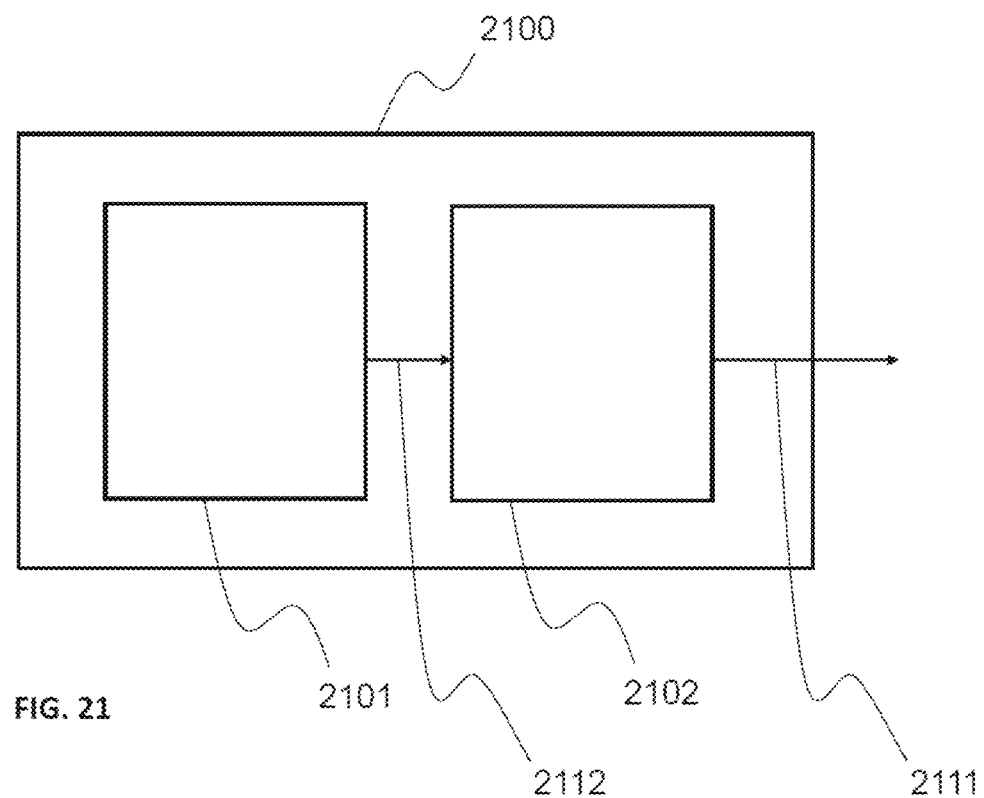
FIG. 21 is a block diagram illustrating an encoder according to the fourteenth aspect of the present disclosure.

FIG. 21 is a block diagram illustrating an encoder according to the fourteenth aspect of the present disclosure. According to a fourteenth aspect of the present disclosure there is provided an encoder 2100, comprising a determining unit 2101 (may be loop filter 220), configured to determining a value 2112 of a syntax element for a current block, wherein the syntax element is an ALF clipping value index or an ALF filter coefficient parameter, an entropy encoding unit 2102 (may be entropy encoding unit 270), configured to generate a bitstream 2111 based on the value 2112 of the syntax element, wherein at least one bit in the bitstream 2111 representing the syntax element, wherein the at least one bit of the syntax element is obtained by using only the value of the syntax element for the current block.

The present disclosure provide the following further embodiments.

Embodiment 1

A method of coding implemented by a decoding device, comprising obtaining a bitstream, at least one bit in the bitstream corresponding to a syntax element for a current block (or a set of blocks, one block in the set of blocks is the current block), parsing the bitstream, to obtain a value of the syntax element for the current block, wherein the value of the syntax element for the current block is obtained only refers to the at least one bit, filtering the current block, based on the value of the syntax element for the current block.

Embodiment 2

The method of embodiment 1, wherein the value of the syntax element is coded according to a fixed length code (fixed length code means that all the possible values of the syntax element are signaled using same number of bits).

Embodiment 3

The method of embodiment 1, wherein the value of the syntax element is coded according to a truncated unary code (truncated unary code means that the most frequent occurring value of the given syntax element is signalled using the least number of bits, and the least occurring value of the syntax element is signalled using the most number of bits).

Embodiment 4

The method of any one of the embodiments 1 to 3, wherein the syntax element is an ALF clipping index parameter.

Embodiment 5

The method of any one of the embodiments 1 to 3, wherein the syntax element is an ALF coefficient parameter.

Embodiment 6

The method of any one of the embodiments 1 to 5, wherein the value of the syntax element is used to determine a filter coefficient, the filter coefficient is used in the filtering process.

Embodiment 7

The method of any one of the embodiments 1 to 5, wherein the value of the syntax element is used to determine a clipping range, the clipping range is used in the filtering process (where the clipping range is used to limit the amount of modification allowed on a given sample by its neighboring sample).

Embodiment 8

A decoder (30) comprising processing circuitry for carrying out the method according to any one of embodiments 1 to 7.

Embodiment 9

A computer program product comprising a program code for performing the method according to any one of embodiments 1 to 7.

Embodiment 10

A decoder, comprising one or more processors, and a non-transitory computer-readable storage medium coupled to the processors and storing programming for execution by the processors, wherein the programming, when executed by the processors, configures the decoder to carry out the method according to any one of embodiments 1 to 7.

Following is an explanation of the applications of the encoding method as well as the decoding method as shown in the above-mentioned embodiments, and a system using them.

Figure 22:
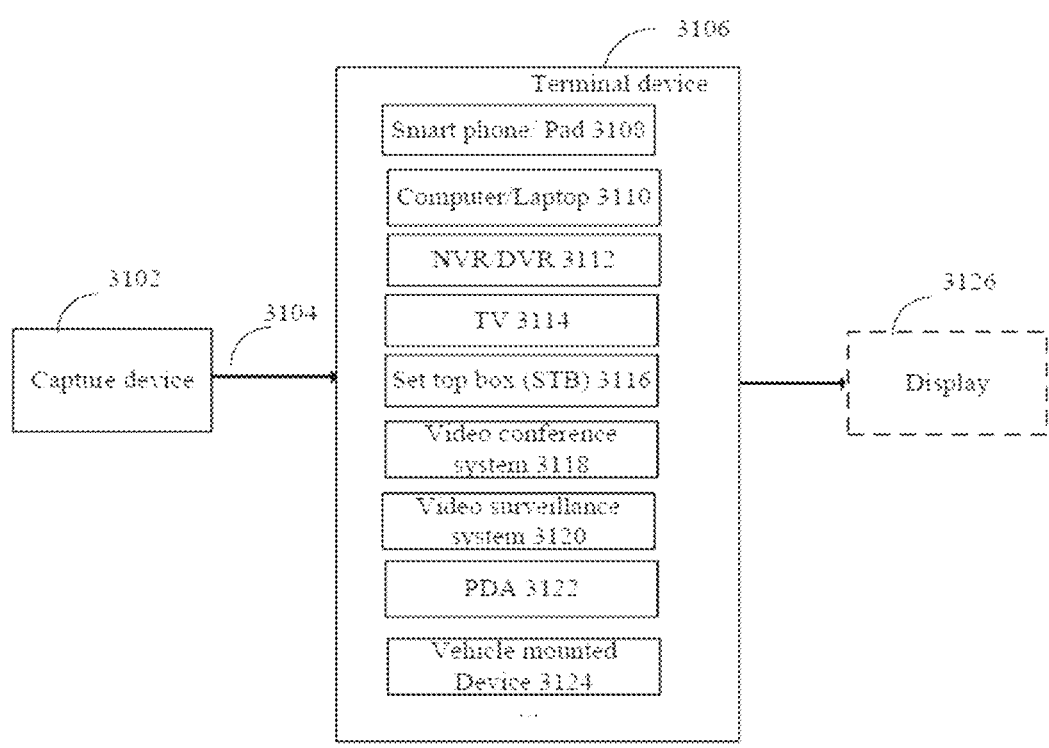
FIG. 22 is a block diagram showing an example structure of a content supply system 3100 which realizes a content delivery service.

FIG. 22 is a block diagram showing a content supply system 3100 for realizing content distribution service. This content supply system 3100 includes capture device 3102, terminal device 3106, and optionally includes display 3126. The capture device 3102 communicates with the terminal device 3106 over communication link 3104. The communication link may include the communication channel 13 described above. The communication link 3104 includes but not limited to WI-FI, Ethernet, cable, wireless (third generation (3G)/fourth generation (4G)/fifth generation (5G)), Universal Serial Bus (USB), or any kind of combination thereof, or the like.

The capture device 3102 generates data, and may encode the data by the encoding method as shown in the above embodiments. Alternatively, the capture device 3102 may distribute the data to a streaming server (not shown in the Figures), and the server encodes the data and transmits the encoded data to the terminal device 3106. The capture device 3102 includes but not limited to camera, smart phone or Pad, computer or laptop, video conference system, personal digital assistant (PDA), vehicle mounted device, or a combination of any of them, or the like. For example, the capture device 3102 may include the source device 12 as described above. When the data includes video, the video encoder 20 included in the capture device 3102 may actually perform video encoding processing. When the data includes audio (i.e., voice), an audio encoder included in the capture device 3102 may actually perform audio encoding processing. For some practical scenarios, the capture device 3102 distributes the encoded video and audio data by multiplexing them together. For other practical scenarios, for example in the video conference system, the encoded audio data and the encoded video data are not multiplexed. Capture device 3102 distributes the encoded audio data and the encoded video data to the terminal device 3106 separately.

In the content supply system 3100, the terminal device 310 receives and reproduces the encoded data. The terminal device 3106 could be a device with data receiving and recovering capability, such as smart phone or Pad 3108, computer or laptop 3110, network video recorder (NVR)/digital video recorder (DVR) 3112, TV 3114, set top box (STB) 3116, video conference system 3118, video surveillance system 3120, PDA 3122, vehicle mounted device 3124, or a combination of any of them, or the like capable of decoding the above-mentioned encoded data. For example, the terminal device 3106 may include the destination device 14 as described above. When the encoded data includes video, the video decoder 30 included in the terminal device is prioritized to perform video decoding. When the encoded data includes audio, an audio decoder included in the terminal device is prioritized to perform audio decoding processing.

For a terminal device with its display, for example, smart phone or Pad 3108, computer or laptop 3110, NVR/DVR 3112, TV 3114, PDA 3122, or vehicle mounted device 3124, the terminal device can feed the decoded data to its display. For a terminal device equipped with no display, for example, STB 3116, video conference system 3118, or video surveillance system 3120, an external display 3126 is contacted therein to receive and show the decoded data.

When each device in this system performs encoding or decoding, the picture encoding device or the picture decoding device, as shown in the above-mentioned embodiments, can be used.

Figure 23:
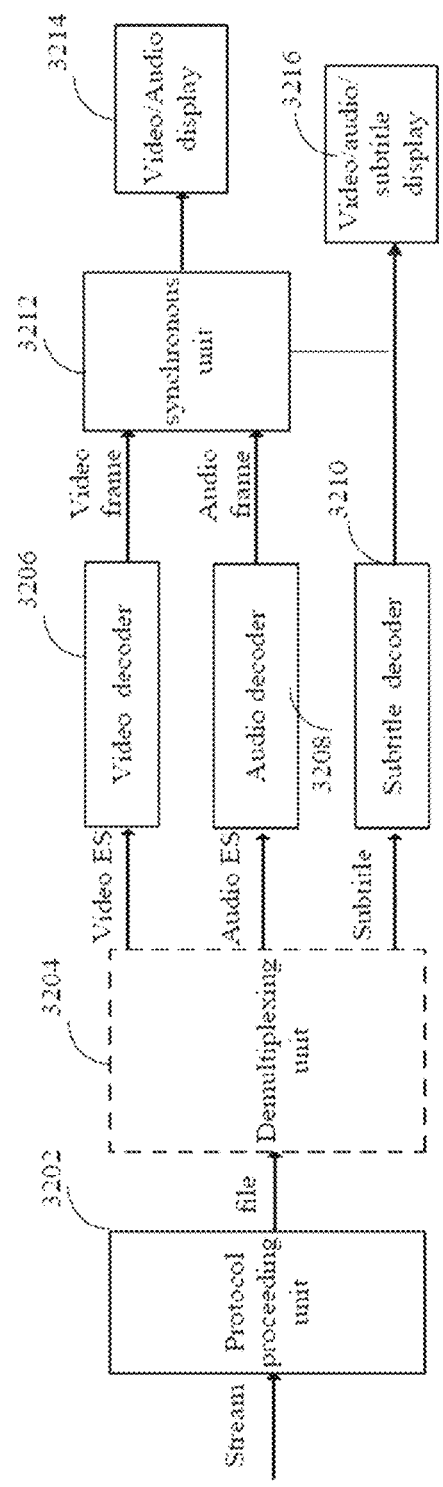
FIG. 23 is a block diagram showing a structure of an example of a terminal device.

FIG. 23 is a diagram showing a structure of an example of the terminal device 3106. After the terminal device 3106 receives stream from the capture device 3102, the protocol proceeding unit 3202 analyzes the transmission protocol of the stream. The protocol includes but not limited to Real Time Streaming Protocol (RTSP), Hypertext Transfer Protocol (HTTP), HTTP Live Streaming Protocol (HLS), MPEG-Dynamic Adaptive Streaming over HTTP (DASH), Real-Time Transport Protocol (RTP), Real Time Messaging Protocol (RTMP), or any kind of combination thereof, or the like.

After the protocol proceeding unit 3202 processes the stream, stream file is generated. The file is outputted to a demultiplexing unit 3204. The demultiplexing unit 3204 can separate the multiplexed data into the encoded audio data and the encoded video data. As described above, for some practical scenarios, for example in the video conference system, the encoded audio data and the encoded video data are not multiplexed. In this situation, the encoded data is transmitted to video decoder 3206 and audio decoder 3208 without going through the demultiplexing unit 3204.

Via the demultiplexing processing, video elementary stream (ES), audio ES, and optionally subtitle are generated. The video decoder 3206, which includes the video decoder 30 as explained in the above mentioned embodiments, decodes the video ES by the decoding method as shown in the above-mentioned embodiments to generate video frame, and feeds this data to the synchronous unit 3212. The audio decoder 3208, decodes the audio ES to generate audio frame, and feeds this data to the synchronous unit 3212. Alternatively, the video frame may store in a buffer (not shown in FIG. 23) before feeding it to the synchronous unit 3212. Similarly, the audio frame may store in a buffer (not shown in FIG. 23) before feeding it to the synchronous unit 3212.

The synchronous unit 3212 synchronizes the video frame and the audio frame, and supplies the video/audio to a video/audio display 3214. For example, the synchronous unit 3212 synchronizes the presentation of the video and audio information. Information may code in the syntax using time stamps concerning the presentation of coded audio and visual data and time stamps concerning the delivery of the data stream itself.

If subtitle is included in the stream, the subtitle decoder 3210 decodes the subtitle, and synchronizes it with the video frame and the audio frame, and supplies the video/audio/subtitle to a video/audio/subtitle display 3216.

The present disclosure is not limited to the above-mentioned system, and either the picture encoding device or the picture decoding device in the above-mentioned embodiments can be incorporated into other system, for example, a car system.

Although embodiments of the disclosure have been primarily described based on video coding, it should be noted that embodiments of the coding system 10, encoder 20 and decoder 30 (and correspondingly the system 10) and the other embodiments described herein may also be configured for still picture processing or coding, i.e. the processing or coding of an individual picture independent of any preceding or consecutive picture as in video coding. In general, only inter-prediction units 244 (encoder) and 344 (decoder) may not be available in case the picture processing coding is limited to a single picture 17. All other functionalities (also referred to as tools or technologies) of the video encoder 20 and video decoder 30 may equally be used for still picture processing, e.g., residual calculation 204/304, transform 206, quantization 208, inverse quantization 210/310, (inverse) transform 212/312, partitioning 262/362, intra-prediction 254/354, and/or loop filtering 220, 320, and entropy coding 270 and entropy decoding 304.

Embodiments, e.g., of the encoder 20 and the decoder 30, and functions described herein, e.g., with reference to the encoder 20 and the decoder 30, may be implemented in hardware, software, firmware, or any combination thereof. If implemented in software, the functions may be stored on a computer-readable medium or transmitted over communication media as one or more instructions or code and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limiting, such computer-readable storage media can comprise RAM, ROM, electrically erasable programmable ROM (EEPROM), compact disc (CD) ROM (CD-ROM) or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes CD, laser disc, optical disc, DVD, floppy disk and BLU-RAY disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

The invention claimed is:

1. A method, comprising:
   obtaining a bitstream, wherein at least one bit in the bitstream represents a syntax element for a current block, wherein the at least one bit comprises two bits, wherein the syntax element specifies a clipping index of a clipping value for an adaptive loop filter (ALF), and wherein the syntax element is coded using a fixed length code;
   parsing the bitstream to obtain a value of the syntax element for the current block, wherein the value of the syntax element for the current block comprises one of four clipping values, and wherein the one of four clipping values is a numeric value that is used to determine a clipping range for adaptive loop filtering; and
   applying, based on the value, the adaptive loop filtering on the current block.

2. The method of claim 1, wherein the fixed length code comprises a binary representation of an unsigned integer using the at least one bit.

3. The method of claim 1, wherein the syntax element is for a set of blocks, and wherein the current block is one of the set of blocks.

4. The method of claim 1, wherein the syntax element is at a slice level.

5. A method, comprising:
   obtaining a bitstream, wherein at least one bit in the bitstream represents a syntax element for a current block, wherein the at least one bit comprises two bits, and wherein the syntax element is an adaptive loop filter (ALF) clipping value index or an ALF coefficient parameter;
   parsing, using the at least one bit, the bitstream to obtain a value of the syntax element for the current block, wherein the value of the syntax element of the current block comprises one of four clipping values, and wherein the one of four clipping values is a numeric value that is used to determine a clipping range for adaptive loop filtering; and
   applying, based on the value, the adaptive loop filtering on the current block.

6. The method of claim 5, wherein the syntax element has been coded using a fixed length code.

7. The method of claim 6, wherein the fixed length code comprises a binary representation of an unsigned integer using the at least one bit.

8. The method of claim 5, wherein the syntax element is for a set of blocks, and wherein the current block is one of the set of blocks.

9. The method of claim 5, wherein the syntax element is at a slice level.

10. The method of claim 5, further comprising calculating, using the ALF coefficient parameter, an ALF coefficient.

11. The method of claim 5, wherein the syntax element is the ALF clipping value index.

12. The method of claim 11, further comprising identifying, using the ALF clipping value index, the one of four clipping values.

13. The method of claim 5, further comprising calculating, using the ALF clipping value index, the clipping range for the adaptive loop filtering.

14. An apparatus, comprising:
   one or more processors; and
   a non-transitory computer-readable storage medium coupled to the one or more processors and configured to store programming instructions for execution by the one or more processors, wherein the programming instructions, when executed by the one or more processors, cause the apparatus to:
   obtain a bitstream, wherein at least one bit in the bitstream represents a syntax element for a current block, wherein the at least one bit comprises two bits, and wherein the syntax element is an adaptive loop filter (ALF) clipping value index or an ALF coefficient parameter;
   parse, using the at least one bit, the bitstream to obtain a value of the syntax element for the current block, wherein the value of the syntax element for the current block comprises one of four clipping values, and wherein the one of four clipping values is a numeric value that is used to determine a clipping range for adaptive loop filtering; and
   apply, based on the value, the adaptive loop filtering on the current block.

15. The apparatus of claim 14, wherein the syntax element has been coded using a fixed length code.

16. The apparatus of claim 15, wherein the fixed length code comprises a binary representation of an unsigned integer using the at least one bit.

17. The apparatus of claim 15, wherein the syntax element is for a set of blocks, and wherein the current block is one of the set of blocks.

18. The apparatus of claim 15, wherein the syntax element is at a slice level.

19. The apparatus of claim 15, wherein the programming instructions, when executed by the one or more processors, further cause the apparatus to obtain, using the ALF coefficient parameter, an ALF coefficient.

20. The apparatus of claim 15, wherein the syntax element is the ALF clipping value index.

* * * * *